US012674544B1

(12) United States Patent
Karimi et al.

(10) Patent No.: US 12,674,544 B1
(45) Date of Patent: Jul. 7, 2026

(54) UNIVERSAL PLUG RETENTION MECHANISM

(71) Applicant: Geotab Inc., Oakville (CA)

(72) Inventors: Sajjad Karimi, Mississauga (CA); Naim Hilal, Toronto (CA); Kathryn Zuliani, Oakville (CA); Mikaela Antunes, Oakville (CA); Usman Younas, Georgetown (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/413,798

(22) Filed: Dec. 9, 2025

Related U.S. Application Data

(60) Provisional application No. 63/924,035, filed on Nov. 24, 2025.

(51) Int. Cl.
F16M 13/02 (2006.01)

(52) U.S. Cl.
CPC .................................... F16M 13/02 (2013.01)

(58) Field of Classification Search
CPC ............................ F16M 13/02; H01R 13/6395
See application file for complete search history.

(56) References Cited

U.S. PATENT DOCUMENTS

| | | | | | |
|---|---|---|---|---|---|
| 4,066,313 | A | * | 1/1978 | von dem Hagen .. | H01R 13/639 439/471 |
| 4,121,880 | A | * | 10/1978 | Rollins .............. | H01R 13/6395 439/353 |
| 4,652,069 | A | * | 3/1987 | Smith ................ | H01R 13/6395 439/449 |
| 5,575,677 | A | * | 11/1996 | Buckner ............ | H01R 13/6395 439/373 |
| 6,319,044 | B1 | * | 11/2001 | Stekelenburg ..... | H01R 13/6392 439/369 |

(Continued)

FOREIGN PATENT DOCUMENTS

| | | |
|---|---|---|
| CN | 211295572 U | 8/2020 |
| CN | 215816651 U | 2/2022 |

(Continued)

*Primary Examiner* — Eret C Mcnichols
(74) *Attorney, Agent, or Firm* — Sherif A. Abdel-Kader

(57) ABSTRACT

A universal plug retention system is disclosed, designed for securing plugs, such as USB-C connectors, to electronic devices in environments subject to vibration, shock, and pulling forces. The system comprises a housing bracket (800) attachable to an electronic device, a plug retainer (1200) accommodating plugs with varying overmold sizes, and an engagement mechanism allowing adjustable positioning of the retainer while resisting withdrawal. The engagement mechanism includes features such as a ratchet rack (1290) with ratchet ribs (1280), a ratchet pawl (862), and optional sidewall teeth (1622) or angled teeth (1620). The plug retainer includes a front wall aperture (1240) for capturing plugs via orientation change and zip tie apertures (1250) for additional retention. The system ensures secure, vibration-resistant connections without requiring custom overmolds, supporting diverse plug geometries. Applications include telematics devices, asset trackers, and other electronic systems requiring robust plug retention in dynamic environments.

23 Claims, 20 Drawing Sheets

(56)                    References Cited

U.S. PATENT DOCUMENTS

| | | | | |
|---|---|---|---|---|
| 6,595,790 | B1 * | 7/2003 | Bigotto | H01R 13/62905 |
| | | | | 439/157 |
| 7,014,493 | B1 * | 3/2006 | Battard | H01R 13/6395 |
| | | | | 439/373 |
| 7,559,788 | B2 * | 7/2009 | Legg | H01R 13/6395 |
| | | | | 439/373 |
| 7,637,772 | B2 * | 12/2009 | Wang | H02G 3/18 |
| | | | | 439/536 |
| 7,914,316 | B2 * | 3/2011 | D'Addario | H01R 13/621 |
| | | | | 439/364 |
| 8,376,773 | B2 * | 2/2013 | Ma | H01R 13/639 |
| | | | | 439/373 |
| 8,613,629 | B2 * | 12/2013 | Gong | H01R 13/6395 |
| | | | | 439/371 |
| 8,926,358 | B2 * | 1/2015 | Kuo | H01R 13/629 |
| | | | | 439/367 |
| 9,391,402 | B2 * | 7/2016 | Lin | H01R 13/6395 |
| 9,437,964 | B2 * | 9/2016 | Hwang | H01R 13/5812 |

| | | | | |
|---|---|---|---|---|
| 10,395,082 | B1 * | 8/2019 | Thompson | G06K 7/10881 |
| 10,547,145 | B2 * | 1/2020 | Bowen | H01R 13/6392 |
| 10,965,061 | B2 * | 3/2021 | Veit | H01R 13/506 |
| 11,552,415 | B2 * | 1/2023 | Tsorng | H01R 12/515 |
| 11,552,429 | B2 * | 1/2023 | Kumarswamy | H01R 13/73 |
| 11,755,788 | B2 | 9/2023 | Morrison et al. | |
| 12,249,785 | B2 * | 3/2025 | Wan Sulaiman | H01R 13/5205 |
| 2002/0068477 | A1 * | 6/2002 | Chen-Chiang | H01R 13/6395 |
| | | | | 439/373 |
| 2012/0184124 | A1 * | 7/2012 | Ma | H01R 13/639 |
| | | | | 439/345 |
| 2016/0020535 | A1 * | 1/2016 | Hwang | H01R 13/5812 |
| | | | | 439/62 |
| 2026/0016121 | A1 * | 1/2026 | Brown | F16M 13/022 |

FOREIGN PATENT DOCUMENTS

| | | | | | |
|---|---|---|---|---|---|
| CN | 215955583 | U | * | 3/2022 | H01R 13/4361 |
| CN | 114784573 | A | | 7/2022 | |
| EP | 2827279 | B1 | | 4/2021 | |

* cited by examiner

100

202

220

222

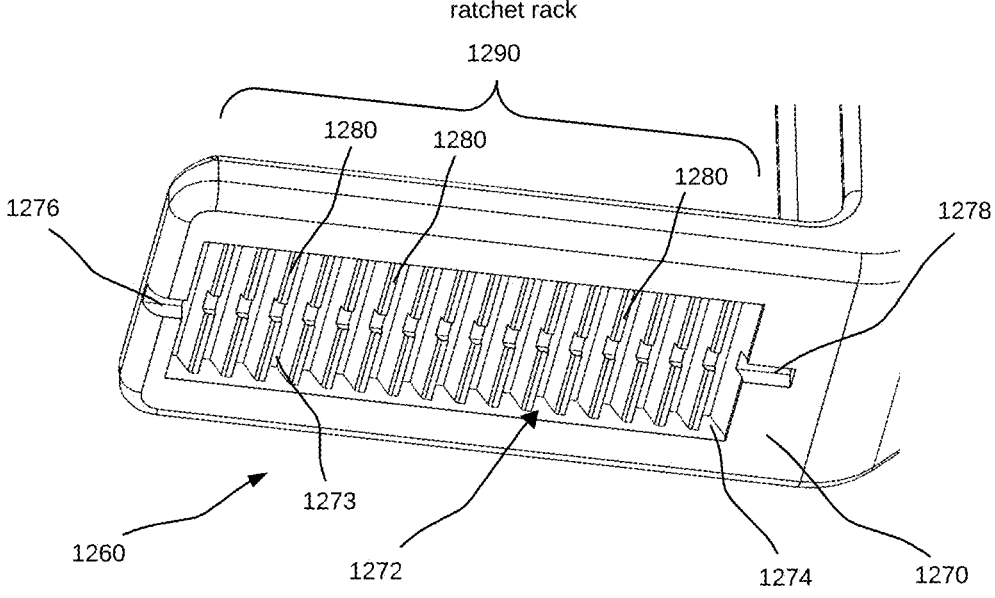
ratchet rack
1290
FIG. 12C
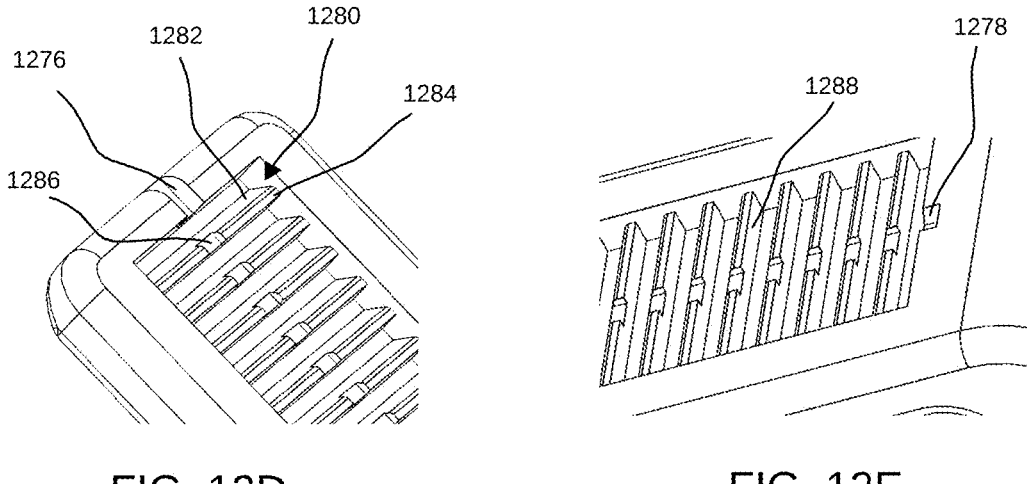
FIG. 12D                        FIG. 12E

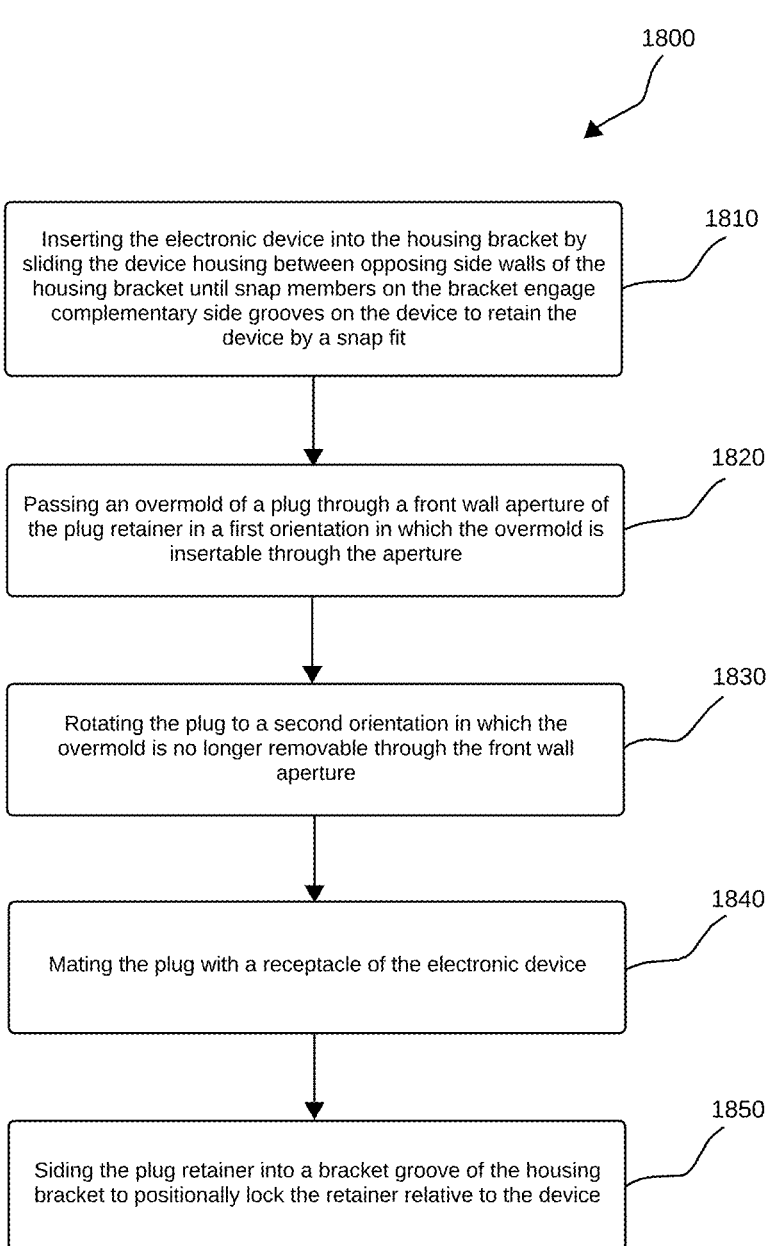

1800

Inserting the electronic device into the housing bracket by sliding the device housing between opposing side walls of the housing bracket until snap members on the bracket engage complementary side grooves on the device to retain the device by a snap fit — 1810

Passing an overmold of a plug through a front wall aperture of the plug retainer in a first orientation in which the overmold is insertable through the aperture — 1820

Rotating the plug to a second orientation in which the overmold is no longer removable through the front wall aperture — 1830

Mating the plug with a receptacle of the electronic device — 1840

Siding the plug retainer into a bracket groove of the housing bracket to positionally lock the retainer relative to the device — 1850

FIG. 18

UNIVERSAL PLUG RETENTION MECHANISM

RELATED APPLICATIONS

This application claims priority from U.S. provisional application 63/924,035 filed Nov. 24, 2025, the contents of which are herein incorporated by reference in their entirety.

TECHNICAL FIELD

The present disclosure relates to electronic device retention systems, specifically to mechanisms for securing plugs to electronic devices to prevent disconnection caused by vibration or pulling forces.

BACKGROUND

In many modern telematics and asset-tracking installations, electronic devices are mounted on vehicles, machinery, and other equipment where reliable peripheral connections are necessary. Connectors such as USB-C, mini-USB, and various general-purpose I/O interfaces provide power and data links for cameras, microphones, external sensors, GNSS receivers, and charging cables. These devices often operate under dynamic conditions including vibration, shock, and exposure to environmental elements. In addition, many installations take place in confined spaces behind dashboards or within enclosed housings, which complicates cable routing and retention. A loss of connector engagement may cause intermittent data loss, power interruption, or unplanned system resets, leading to reduced operational efficiency and increased maintenance requirements.

One of the main obstacles facing equipment installers and field technicians is the wide diversity of connector overmold dimensions across cable manufacturers. While metal interfaces such as the USB-C contact region are standardized, the surrounding overmold cross-section, length, and width remain unregulated. As a result, cables from different suppliers can exhibit significantly different profiles, preventing off-the-shelf retainers from fitting all designs.

SUMMARY

In one aspect of the present disclosure, there is provided a universal plug retention mechanism comprising a housing bracket configured to attach to an electronic device and provide a plug retainer support interface, a plug retainer configured to secure a plug to the electronic device and to accommodate plugs with varying overmold sizes, and an engagement mechanism between the housing bracket and the plug retainer configured to permit advancement of the plug retainer toward the electronic device while resisting withdrawal, thereby providing discrete, adjustable positioning of the plug retainer relative to the housing bracket and securing the plug retainer against movement relative to the housing bracket during vibration or pulling forces to maintain the plug engaged with the device. This ensures robust, adjustable retention across diverse overmold geometries without custom plugs or cables.

The engagement mechanism may comprise a ratchet rack including a plurality of parallel ratchet ribs each having a sloped leading surface and an upright trailing surface to allow insertion adjustment of the plug retainer toward the electronic device while resisting withdrawal. This secures one-way incremental positioning with strong anti-backout performance under shock and vibration.

The plug retainer support interface may include a tongue projecting into a bracket groove, and a ratchet pawl may be formed at a distal end of the tongue. This improves latch compactness and strength while simplifying molding.

The tongue may further comprise a longitudinal guide ridge and the plug retainer may comprise a retainer bottom groove with front and rear guiding notches sized to slidingly receive the guide ridge. This ensures constrained, aligned insertion and reduces misalignment.

The retainer bottom groove may be comprised of a plurality of notches formed on a top wall of a plurality of ratchet ribs. This improves guidance and distributes contact stress across ribs for durable engagement.

The bracket groove may include a plurality of bracket groove sidewall teeth on opposed bracket groove sidewalls, and a plug retainer lower wall may comprise left and right resilient fingers separated by a longitudinal slot, each finger having outwardly facing finger teeth that are engageable with the bracket groove sidewall teeth to provide discrete, adjustable positioning of the plug retainer relative to the housing bracket by side-to-side tooth engagement. This secures an alternative, self-biasing lock tolerant of dimensional variation.

The bracket groove sidewall teeth and the outwardly facing finger teeth may each comprise an asymmetric tooth profile having a sloped leading face and an upright trailing face to permit advancement toward the electronic device while resisting withdrawal. This ensures smooth insertion coupled with strong anti-reverse locking.

The outwardly facing finger teeth on left and right resilient fingers of the plug retainer may have mismatched lead-in angles such that initial engagement causes inward flex followed by outward snap-back to a locked position that resists reverse motion. This improves controlled seating and vibration robustness.

A bottom of the bracket groove may include a plurality of angled teeth and a plug retainer lower wall may include complementary angled teeth, the angled teeth being configured to permit insertion advancement by ramp sliding toward the electronic device while resisting withdrawal by a backstop angle. This simplifies the mechanism while maintaining strong anti-withdrawal behavior.

A lead-in angle of the angled teeth may be between 20 degrees and 45 degrees and a backstop angle may be between 80 degrees and 95 degrees. This balances insertion effort with retention strength.

The plug retainer may include a front wall aperture dimensioned to admit a plug overmold in a first orientation and to retain the plug overmold after rotation to a second orientation approximately 90 degrees from the first orientation. This ensures capture of standard overmolds without custom recesses.

When the electronic device is installed in the housing bracket, a bottom surface of the device housing may bear against an upper surface of a lower wall of the plug retainer to apply a force that maintains engagement between the housing bracket and the plug retainer during vibration or pulling forces, thereby securing the plug retainer against movement relative to the housing bracket and maintaining the plug engaged with the device. This secures preload using existing structure to improve retention.

The plug retainer may include a plurality of zip tie apertures positioned at different distances from the front wall aperture to accommodate different overmold depths. This improves tie routing consistency and flexible retention across plug variants.

A zip tie may be routed through zip tie channels of the housing bracket and through a selected one of the zip tie apertures of the plug retainer, the zip tie preventing front-to-back translation of the retainer relative to the housing bracket. This stabilizes the assembly under high-vibration conditions.

The housing bracket may include a left side zip tie channel and a right side zip tie channel each configured to laterally confine the zip tie and resist displacement under vibration. This prevents tie migration and abrasion, improving durability.

The housing bracket may include a self-feeding zip tie channel arranged to guide a zip tie from a first side of the bracket to an opposite side even when the bracket is flush-mounted to a surface, the self-feeding zip tie channel being comprised of the left side zip tie channel and the right side zip tie channel and a bottom zip tie channel formed axially on a bottom surface of the housing bracket. This enables blind routing and reduces installation effort and errors.

The housing bracket may further include snap members on opposite side walls configured to engage complementary side grooves on the electronic device to retain the bracket to the device by a snap fit. This enables fast, tool-less mounting and removal.

At least one of the bracket side walls may be resiliently deflectable outward during insertion of the electronic device and may return inward to engage the side grooves after insertion. This tolerates dimensional variability while maintaining strong retention.

A transverse zip tie path may be configured to secure a plug having an overmold recess to a receptacle of the electronic device. This enables dual-retention strategies for maximum robustness.

The bracket groove receiving the plug retainer may be formed in an extended portion of the housing bracket and may have a rectangular cross-section with opposed sidewalls guiding insertion of the plug retainer. This improves insertion guidance and alignment while allowing flexible bracket placement.

The engagement mechanism may be configured to permit incremental advancement toward the electronic device of less than 1 millimeter per tooth to fine-tune retainer position with respect to overmold depth. This ensures precise axial fit across different plugs and batches.

The ratchet pawl may be integrally molded with the housing bracket and may include a resilient hinge region enabling elastic deflection during advancement of the plug retainer. This reduces part count and assembly complexity while ensuring reliable engagement. The rotation from the first orientation to the second orientation may be within a range of 70 degrees to 110 degrees. This broadens compatibility with varied overmold aspect ratios and insertion clearances.

An interference fit between the bottom surface of the device housing and the upper surface of the lower wall of the plug retainer may be configured to maintain engagement between the housing bracket and the plug retainer. This adds frictional preload that improves anti-backout performance.

A right zip tie channel and a left zip tie channel may each include a bend where the respective channel meets a bracket base, the bend being configured to deflect a zip tie into and out of a bottom zip tie channel. This enables self-feeding routing even in flush mounts, improving installability.

At least one of the bracket side walls may be resiliently deflectable outward during insertion of the electronic device and returns inward to engage the side grooves after insertion. This enhances ease of installation and maintains a secure snap-fit over time. The housing bracket may further comprise a planar base with elongated mounting slots for positional adjustment and at least one fixed fastener hole to lock a final installation position. This ensures long-term stability after alignment.

In another aspect of the present disclosure, there is provided a method for securing a plug to an electronic device using a housing bracket and a plug retainer, comprising inserting the electronic device into the housing bracket by sliding the device housing between opposing side walls of the housing bracket until snap members on the bracket engage complementary side grooves on the device to retain the device by a snap fit, passing an overmold of a plug through a front wall aperture of the plug retainer in a first orientation in which the overmold is insertable through the aperture, rotating the plug to a second orientation in which the overmold is no longer removable through the front wall aperture, mating the plug with a receptacle of the electronic device, and sliding the plug retainer into a bracket groove of the housing bracket to positionally lock the retainer relative to the device by an engagement mechanism. This ensures a field-ready, tool-light procedure that reliably secures standard plugs under vibration and pull.

Sliding the plug retainer into the bracket groove may comprise engaging a ratchet pawl on the housing bracket with a ratchet rack on the plug retainer. This ensures one-way adjustment and strong anti-withdrawal security.

Sliding the plug retainer into the bracket groove may comprise inserting a lower wall of the retainer into a rectangular bracket groove until the ratchet pawl rides over a plurality of ratchet ribs of the ratchet rack and seats behind at least one ratchet rib. This provides tactile feedback and confirms positive seating for robust retention.

Sliding the plug retainer into the bracket groove may comprise advancing complementary angled teeth on a lower wall of the retainer over angled teeth on a groove bottom until a backstop prevents withdrawal. This offers a predictable, pawl-free insertion with strong resistance to backout.

Sliding the plug retainer into the bracket groove may comprise laterally inserting the retainer between opposed bracket groove sidewalls so that outwardly facing finger teeth on resilient fingers of the retainer engage bracket groove sidewall teeth to positionally lock the retainer. This secures a quick-snap latch tolerant of dimensional variation.

The method of any one of the foregoing may further comprise routing a zip tie through zip tie channels of the housing bracket and through a selected zip tie aperture of the plug retainer, and tightening the zip tie to: secure the electronic device to the housing bracket; and prevent front-to-back translation of the retainer by engagement between sidewalls of the bracket channels and sidewalls of the selected zip tie aperture. This adds a secondary restraint that stabilizes the assembly in high-vibration conditions.

Routing the zip tie may comprise inserting the zip tie into a self-feeding channel of the housing bracket that guides the zip tie from a first side to an opposite side even when the housing bracket is flush-mounted to a surface, the self-feeding channel comprising a left side zip tie channel and a right side zip tie channel and a bottom zip tie channel formed axially on a bottom surface of the housing bracket. This improves blind routing and reduces installation effort.

The left side zip tie channel and the right side zip tie channel may each include a bend at a junction with a bracket base configured to deflect a zip tie into and out of the bottom zip tie channel during routing. This reduces threading effort and misrouting in tight spaces.

Aligning a longitudinal guide ridge of a tongue on the housing bracket with front and rear guiding notches of a retainer bottom groove to constrain insertion of the plug retainer along a defined axis may be performed. This improves insertion accuracy and repeatability.

Selecting one of a plurality of discrete insertion positions of the plug retainer relative to the housing bracket by incremental advancement defined by the engagement mechanism to accommodate a depth of the plug overmold may be performed. This ensures precise axial fit across different plugs and batches.

Selecting one of a plurality of zip tie apertures on the plug retainer based on a measured or observed overmold depth, wherein a small-depth aperture is used when the retainer is closest to a front surface of the device, a medium-depth aperture is used when the retainer is at an intermediate position, and a large-depth aperture is used when the retainer is farthest from the front surface, may be performed. This maintains consistent tie geometry and load path across plug variants.

After the plug retainer is engaged with the housing bracket, a bottom surface of the device housing may bear against an upper surface of a lower wall of the plug retainer to apply a force that maintains positional lock during vibration. This sustains preload to resist loosening.

Inserting the electronic device into the housing bracket may include elastically deflecting at least one bracket side wall outwardly during insertion and allowing the side wall to return inwardly so that bracket snaps seat into device side grooves. This enables quick, reliable, tool-less seating of the electronic device.

Enclosing the zip tie within left and right side zip tie channels of the housing bracket to laterally confine the zip tie and resist displacement under vibration may be performed. This prevents tie chafing and migration, extending service life.

Passing the overmold through the front wall aperture in the first orientation by aligning a largest cross-sectional dimension of the overmold with a width of the aperture, and rotating approximately 90 degrees to align the largest cross-sectional dimension with a height of the aperture to prevent withdrawal, may be performed. This securely captures standard overmolds without custom features.

Prior to tightening the zip tie, adjusting the position of the housing bracket on a mounting surface by sliding fasteners within elongated mounting slots of a planar base of the housing bracket, and then fixing the final position using at least one fixed fastener hole, may be performed. This improves installation accuracy and long-term stability.

Installing a transverse zip tie around a plug and through a transverse path defined by zip tie notches on the device housing to secure a plug with an overmold recess to a receptacle of the device, independently of the plug retainer, may be performed. This provides legacy compatibility and dual-retention capability where required.

Sliding the plug retainer into the bracket groove may comprise manually gripping external ribs on a front wall of the retainer and finger recesses on opposing sides of the retainer to facilitate insertion. This enhances ergonomics and reduces installer effort and slippage.

Removing the zip tie (if present), removing the electronic device from the housing bracket to relieve force on the retainer, disengaging the engagement mechanism to free the retainer, sliding the retainer out of the bracket groove, unplugging the plug from the receptacle, rotating the plug approximately 90 degrees back to the first orientation, and withdrawing the overmold through the front wall aperture, may be performed. This defines a safe, repeatable removal procedure for serviceability.

A right zip tie channel and a left zip tie channel may each include a bend where the respective channel meets a bracket base, the bend being configured to deflect a zip tie into and out of a bottom zip tie channel. This streamlines tie routing during installation and maintenance.

Accessing a service window or access feature of the housing bracket to elastically deflect a pawl or disengage the engagement mechanism and remove the plug retainer without removing the electronic device from the housing bracket may be performed. This reduces service time and avoids disturbing the main mounting.

Routing the zip tie through the housing bracket may comprise inserting the zip tie into the left side zip tie channel and the right side zip tie channel at bends configured to deflect the zip tie into and out of the bottom zip tie channel during routing. This supports blind, efficient tie routing in constrained spaces.

BRIEF DESCRIPTION OF THE DRAWINGS

FIG. 12C is a partial bottom perspective view showing the ratchet rack with ratchet ribs and top notches.

FIG. 12D is a partial bottom perspective view showing the front side of the ratchet ribs and top notches of the ratchet rack.

FIG. 12E is a partial bottom perspective view showing the rear side of the ratchet ribs and top notches of the ratchet rack.

FIG. 18 is a flowchart depicting a method of securing a plug to an electronic device using a housing bracket and a plug retainer.

DETAILED DESCRIPTION

Figure 1:
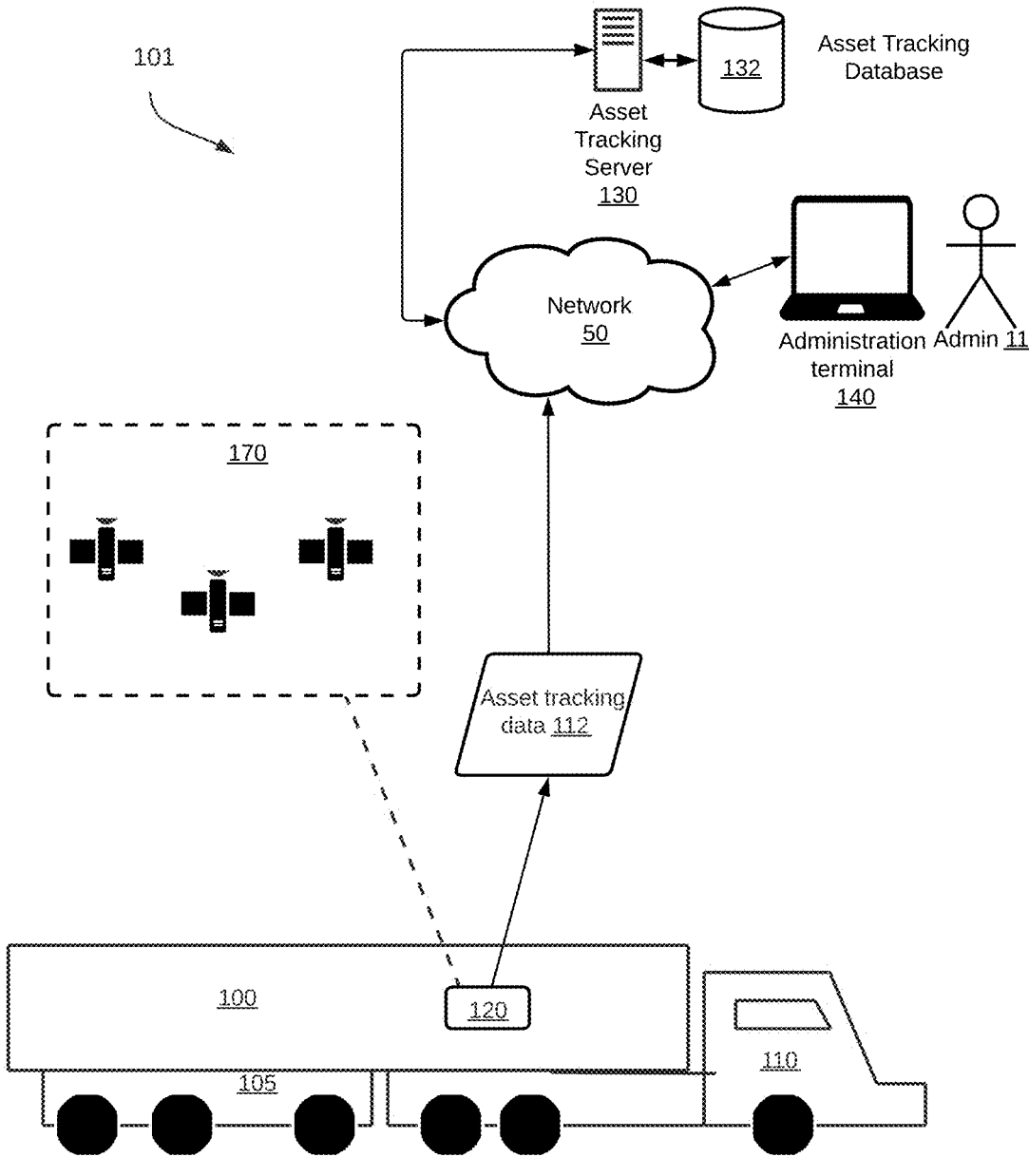
FIG. 1 is a system diagram illustrating an asset tracking system for monitoring and managing tracked assets associated with a vehicle.

The following detailed description provides illustrative examples of the described technology and various embodiments. These examples are presented to enable those skilled in the art to make and use the described technology and are not intended to limit the scope of the claims. The described technology is discussed in the context of electronic device retention systems, particularly mechanisms for securing plugs, such as USB-C connectors, to electronic devices in environments subject to vibration, shock, or other external forces. However, it is to be understood that the principles and features disclosed herein may be applicable to other types of connectors, devices, or use cases.

For clarity and conciseness, certain well-known components, structures, and techniques may not be described in detail, as they are readily understood by those skilled in the art. The described subject matter is intended to encompass various modifications, substitutions, and rearrangements of components, as well as alternative embodiments, provided they fall within the scope of the appended claims. The specific examples and figures provided are illustrative and are not to be construed as limiting the described subject matter to the precise configurations or methods disclosed.

In the domain of electronic device retention systems, particularly for securing peripheral connectors such as USB-C plugs, existing solutions face significant limitations when deployed in dynamic environments. Modern telematics and asset-tracking devices are often installed in vehicles, machinery, or other equipment where vibration, shock, and external forces are prevalent. These conditions frequently lead to unintentional disconnection of plugs from their receptacles, resulting in data loss, power interruptions, or system malfunctions. Furthermore, the diversity in USB-C plug overmold dimensions across manufacturers exacerbates the problem, as the lack of standardization in overmold size and shape prevents conventional retention mechanisms from accommodating a wide range of plug designs. Installers and technicians are left with unreliable or incompatible solutions, increasing maintenance costs and reducing operational efficiency.

The present disclosure addresses these challenges by introducing a universal plug retention system that combines a housing bracket and an adjustable plug retainer. This system is designed to securely retain plugs, such as USB-C connectors, under conditions of vibration, shock, and pulling forces, while accommodating varying overmold dimensions. The described concept leverages a ratchet-based engagement mechanism between the housing bracket and the plug retainer, allowing for discrete, adjustable positioning of the retainer relative to the electronic device. This ensures a secure fit for plugs with different overmold depths, widths, and heights. Additionally, the system incorporates zip tie channels and apertures to provide secondary retention, further enhancing stability and preventing disconnection during operation.

The solution enhances previous approaches by providing a universal, reusable, and durable retention mechanism that accommodates various plug designs without the need for custom overmolds. The ratchet mechanism, in conjunction with the axial and transverse zip tie integration, ensures that the plug stays firmly connected to the device, even under demanding conditions. The modular design of the housing bracket and plug retainer facilitates straightforward installation, removal, and reusability, simplifying the installation process and enhancing user experience. By overcoming the shortcomings of traditional retention systems, this solution offers a dependable and adaptable method for securing peripheral connections in dynamic environments.

The embodiments described herein are presented in the context of telematics devices and asset trackers mounted in vehicles, machinery, and other mobile or industrial assets to illustrate practical installation and use under vibration and shock; however, the disclosed mechanisms, structures, and methods are not limited to such devices or environments and may be implemented with any electronic device requiring robust plug retention. Likewise, while certain examples reference USB-C as a representative connector, the solution is applicable to any connector employing an overmold whose cross section presents orthogonal dimensions where one dimension is longer than the other (e.g., a generally rectangular, obround, or racetrack profile) such that orientation and rotational capture can be exploited. Non-limiting examples include HDMI (Type A, Mini, and Micro), DisplayPort and Mini DisplayPort, USB-A, USB-B and Micro-USB, Lightning, RJ-45 (Ethernet) modular plugs with molded strain reliefs, barrel power connectors with flattened or keyed overmolds, 3.5 mm and 2.5 mm audio jacks with elongated molded grips, proprietary accessory connectors with asymmetric overmolds, and multi-pin I/O or sensor harness connectors (e.g., JST, Molex Micro-Fit, Mini-Fit, or automotive blade/mini-fit style) having overmolds with unequal height and width dimensions. Accordingly, the scope of the disclosure encompasses these and other connectors with similar overmold geometries and is not confined to telematics or asset-tracking implementations.

FIG. 1 shows an asset tracking system 101 designed to monitor and manage assets associated with a vehicle. The system includes an asset tracker 120 installed on an asset 100, which in this embodiment is a trailer 105 connected to a tractor 110. The asset tracker 120 collects asset tracking data 112, which is transmitted through a network 50 to an asset tracking server 130. The asset tracking server 130 processes the data and stores the data in an asset tracking database 132, allowing for efficient data management and retrieval. The asset tracking system 101 utilizes satellites 170 to enhance the tracking capabilities, providing real-time location data and other relevant information. This satellite data is integrated into the asset tracking data 112, ensuring comprehensive monitoring of the asset's status and location.

An administration terminal 140, operated by an admin 11, interfaces with the asset tracking server 130. This terminal allows for the management and analysis of the asset tracking data 112, enabling administrators to make informed decisions regarding asset utilization and logistics. The system's architecture ensures robust communication between the asset tracker 120, the network 50, and the asset tracking server 130, facilitating seamless data flow and operational efficiency.

Overall, the asset tracking system 101 provides a comprehensive solution for monitoring assets in dynamic environments, leveraging satellite data and network connectivity to deliver accurate and timely information to administrators.

Figure 2:
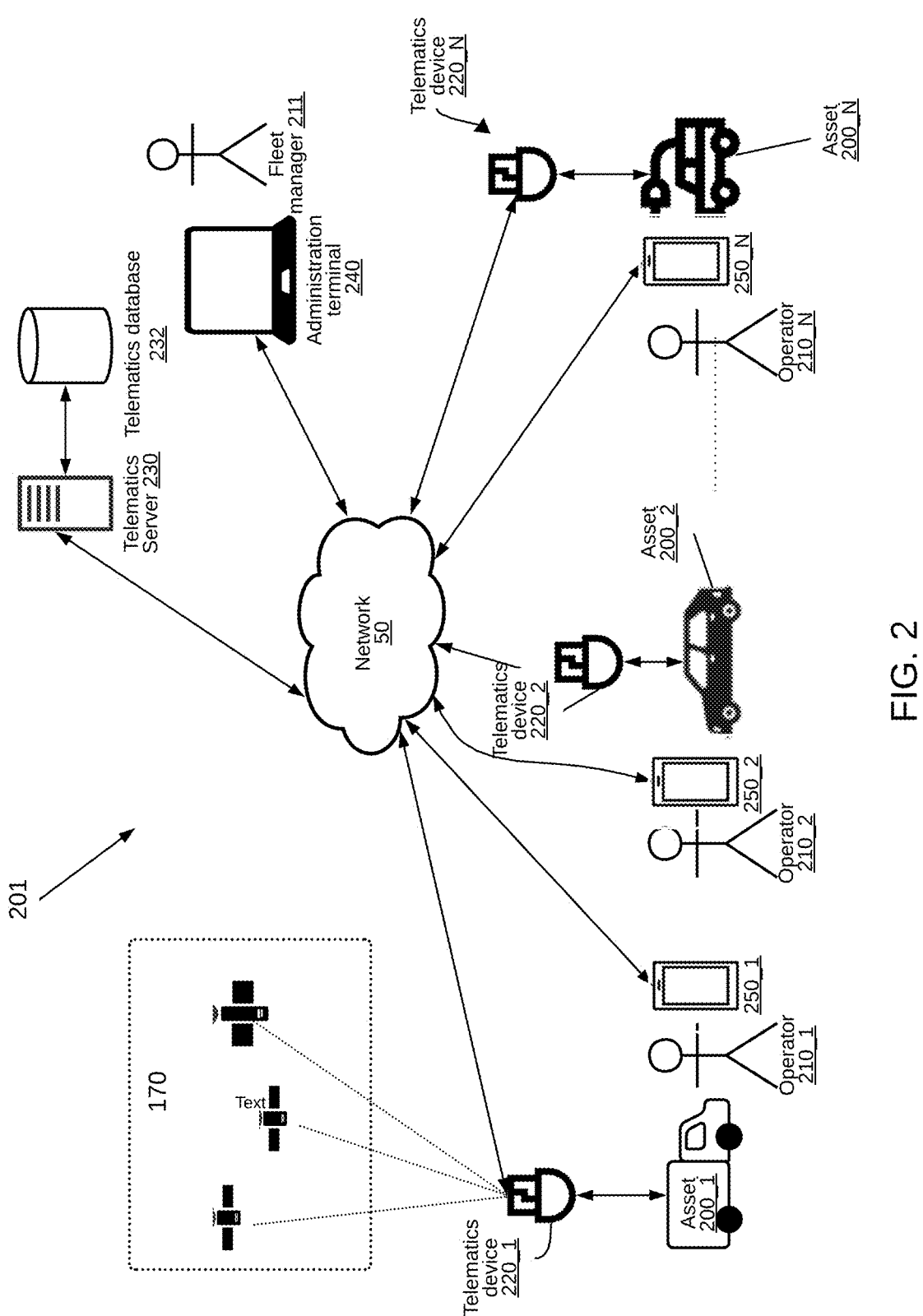
FIG. 2 illustrates a network diagram of a telematics system for asset tracking and management.

FIG. 2 illustrates a telematics system 201 for asset tracking and management. Multiple telematics devices 220_1 . . . 220_N are installed on corresponding assets 200_1 . . . 200_N operated by operators 210_1 . . . 210_N. Each device communicates over a network 50 (cellular/Wi-Fi/satellite) to a telematics server 230, which stores data in a telematics database 232. An administration terminal 240 used by a fleet manager 211 provides access to real-time and historical asset data. Satellites 170 supply positioning and supplementary communication links, enabling continuous monitoring and control of distributed assets.

An electronic device, such as an asset tracker or a telematics device, may be attached to an asset by various mounting means tailored to the installation environment and asset geometry. These means can include fasteners through elongated slots and fixed holes on a bracket, zip tie routing paths that enable secure attachment around structural members, and integration within interior structures such as dashboards or panels to protect the device while providing access to interfaces. The following description, with reference to FIG. 3 and FIG. 4, illustrates exemplary installations in which an asset tracker is secured to an exterior surface of an asset and a telematics device is installed within a vehicle dashboard, respectively, highlighting alternative attachment approaches and routing considerations.

Figure 3:
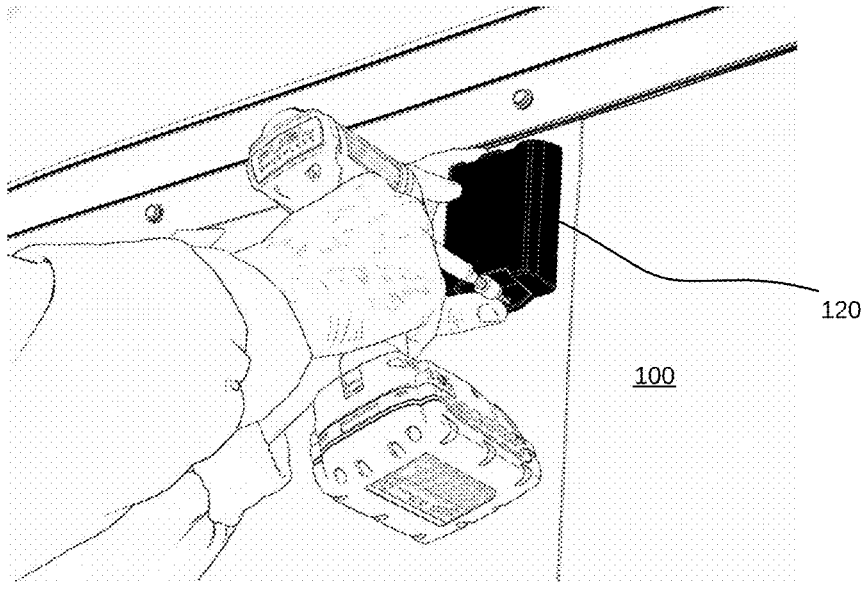
FIG. 3 illustrates a mechanical drawing depicting the installation of an asset tracking device 120 on a surface of an asset 100.

FIG. 3 shows an asset tracker 120 fastened to a surface of an asset 100 using mechanical fasteners such as screws or bolts. This mounting approach provides a stable attachment in environments subject to vibration and shock, ensures consistent operation and connectivity, and facilitates straightforward access for installation and maintenance.

Figure 4:
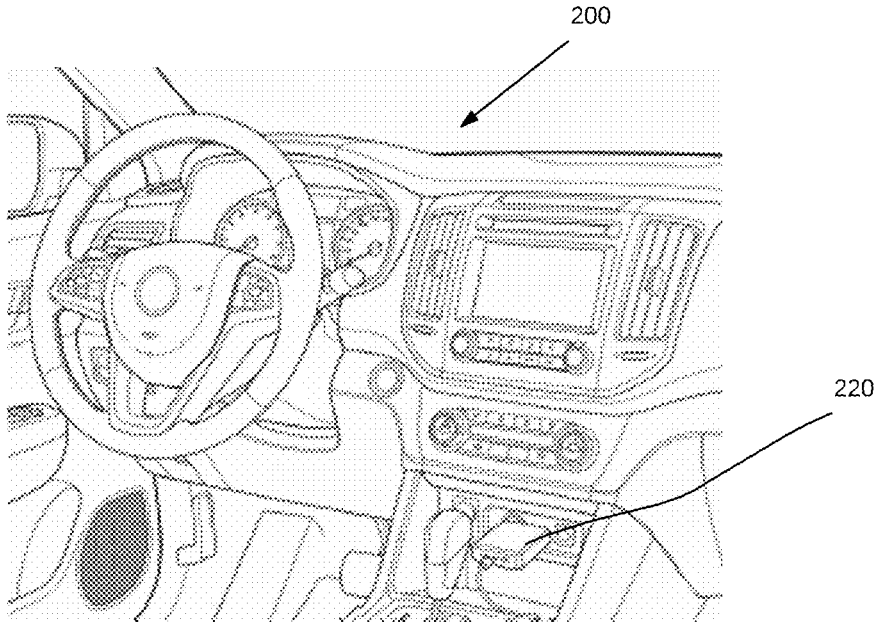
FIG. 4 illustrates a vehicle interior dashboard with an installed telematics device 220 within the dashboard structure 200.
Figure 5:
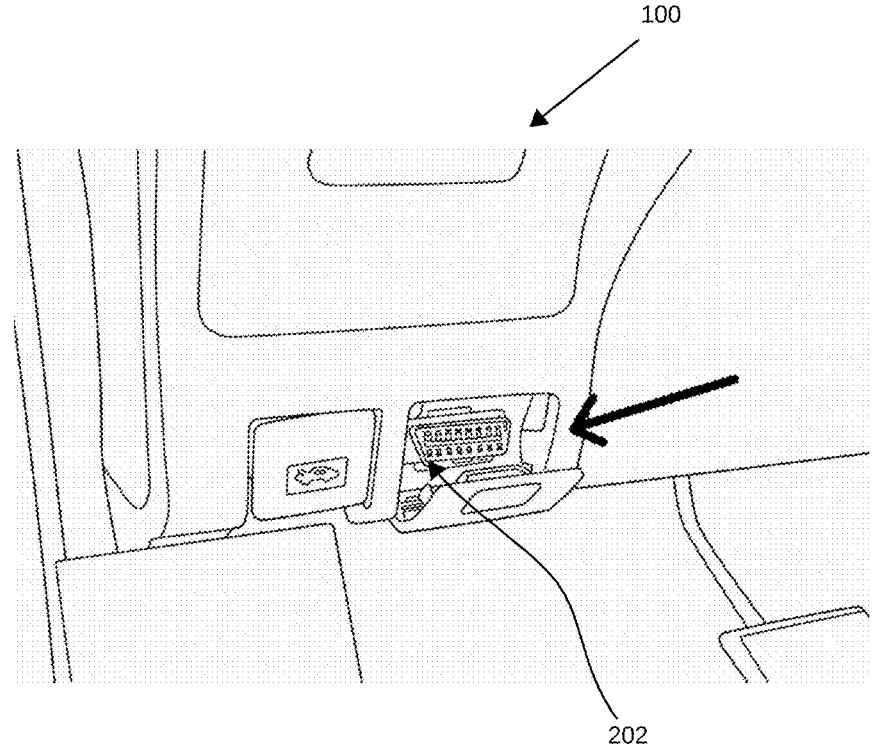
FIG. 5 illustrates a vehicle interior showing a connector port 202 integrated into the asset 100.
Figure 6:
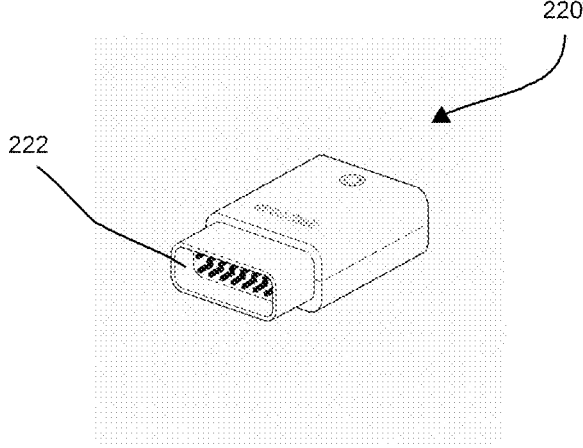
FIG. 6 is a top front right perspective view of a telematics device having an asset interface connector.

FIG. 4, FIG. 5, and FIG. 6 collectively illustrate exemplary asset interfaces and device installations in a vehicle environment. FIG. 4 shows a telematics device 220 installed within a vehicle dashboard structure 200, demonstrating protected, interior mounting that maintains access to peripheral interfaces. FIG. 5 depicts an asset interface port 202 on an asset 100, exemplified by a vehicle OBD port providing power/data connectivity to external devices. FIG. 6 presents a telematics device 220 with an asset interface connector 222 configured to mate with the vehicle's interface port, enabling reliable electrical and data coupling between the device and the asset.

Figure 7A:
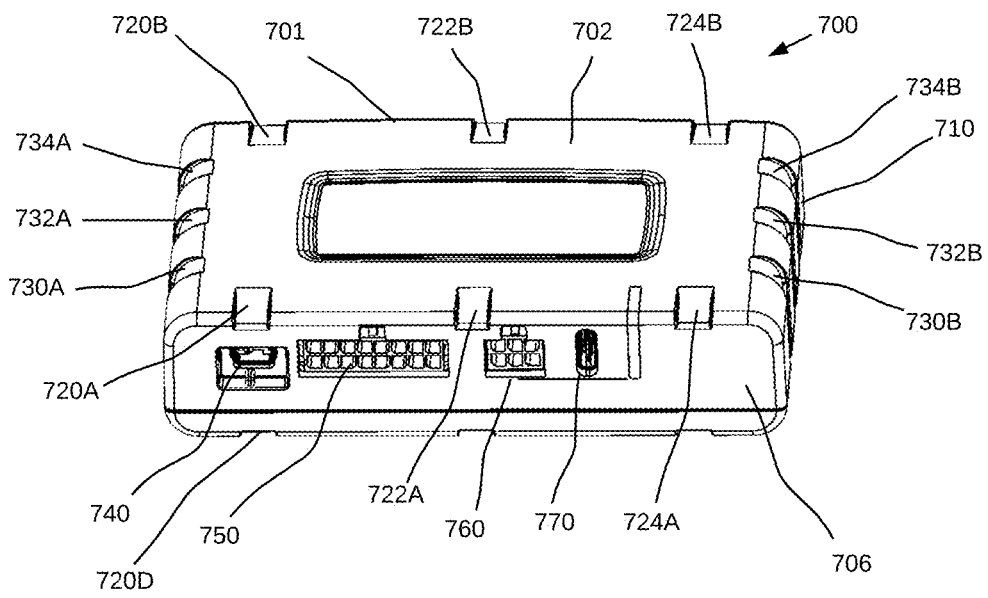
FIG. 7A is a top front perspective view of an electronic device housing with multiple peripheral interfaces and zip tie notches for secure mounting.
Figure 7B:
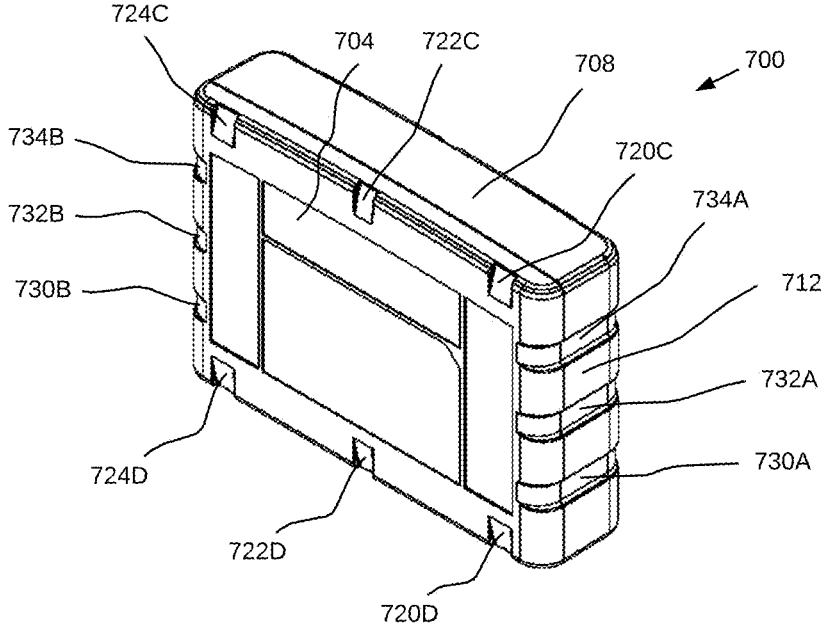
FIG. 7B is a bottom rear left perspective view of an electronic device housing with zip tie notches and grooves for securing the device to an asset.

Modern telematics devices and asset trackers increasingly require multiple peripheral interfaces to support diverse sensing, communication, and user-interaction needs in the field. These interfaces enable connection to input peripherals such as cameras for visual monitoring, microphones for audio capture, external sensors for environmental and operational measurements (e.g., temperature, vibration, door/tilt), and GNSS receivers for enhanced positioning; they also support output peripherals including displays for local status and configuration, speakers or buzzers for alerts, and wired data links for diagnostics and firmware updates. As functionality has expanded, the form factor of these devices has grown to accommodate processing, storage, radio modules, power management, and robust mechanical features, making the housing too large to plug directly into compact vehicle interface ports. Consequently, installers fasten the device elsewhere on the asset-such as a panel, bracket, or interior surface- and connect it to the asset's interface port via a harness, maintaining reliable power and data connectivity while allowing optimal placement for mounting stability, cable routing, and service access. FIG. 7A and FIG. 7B depict an exemplary electronic device with multiple peripheral interfaces arranged on the housing to support these use cases and installation approaches. The electronic device housing contains features that allow the electronic device to be installed in a housing bracket, and for supporting plug retainers as will be detailed below.

FIG. 7A and FIG. 7B depict an electronic device 700 having an electronic device housing 701 with defined surfaces including a top surface 702, bottom surface 704, front surface 706, rear surface 708, right surface 710, and left surface 712. The front surface 706 carries multiple peripheral interfaces: a mini-USB receptacle 740, a harness receptacle 750, a general-purpose I/O receptacle 760, and a USB-C receptacle 770, enabling connection to input/output peripherals and asset interfaces. The housing 701 incorporates zip tie notch groups positioned around the perimeter to facilitate transverse zip tie routing for mounting and cable retention. On the left side, the notch group includes a left top front zip tie notch 720A, left top rear zip tie notch 720B, left bottom rear zip tie notch 720C, and left bottom front zip tie notch 720D. A corresponding middle notch group 722A, 722B, 722C, 722D is formed centrally, and a right notch group comprises right top front zip tie notch 724A, right top rear zip tie notch 724B, right bottom rear zip tie notch 724C, and right bottom front zip tie notch 724D.

The housing 701 further includes side grooves configured to cooperate with bracket snap members for secure installation within a housing bracket and for zip tie alignment. At the front, a left front side groove 730A and a right front side groove 730B receive front bracket snaps; centrally, a left middle side groove 732A and a right middle side groove 732B serve as zip tie alignment paths; and at the rear, a left rear side groove 734A and a right rear side groove 734B receive rear bracket snaps. FIG. 7A emphasizes the front interface layout and upper perimeter features, while FIG. 7B provides a rear-bottom perspective highlighting the distribution of zip tie notches, the bottom surface 704, and the rear surface 708, illustrating how the notches and grooves cooperate to enable secure mounting, cable routing, and bracket engagement.

A housing bracket is described with reference to FIG. 8A, FIG. 8B, FIG. 8C, FIG. 8D, and FIG. 8E. The housing bracket supports an electronic device and forms part of a universal plug retention mechanism, providing a bracket groove and associated engagement features for receiving a plug retainer, mounting structures for fastening to an asset surface, snap members for retaining the device by a snap fit, and zip tie channels for auxiliary retention and cable management. Together, these elements enable adjustable positioning of the plug retainer relative to the device, robust resistance to vibration and pulling forces, and convenient installation and serviceability in diverse deployment environments.

Figure 8A:
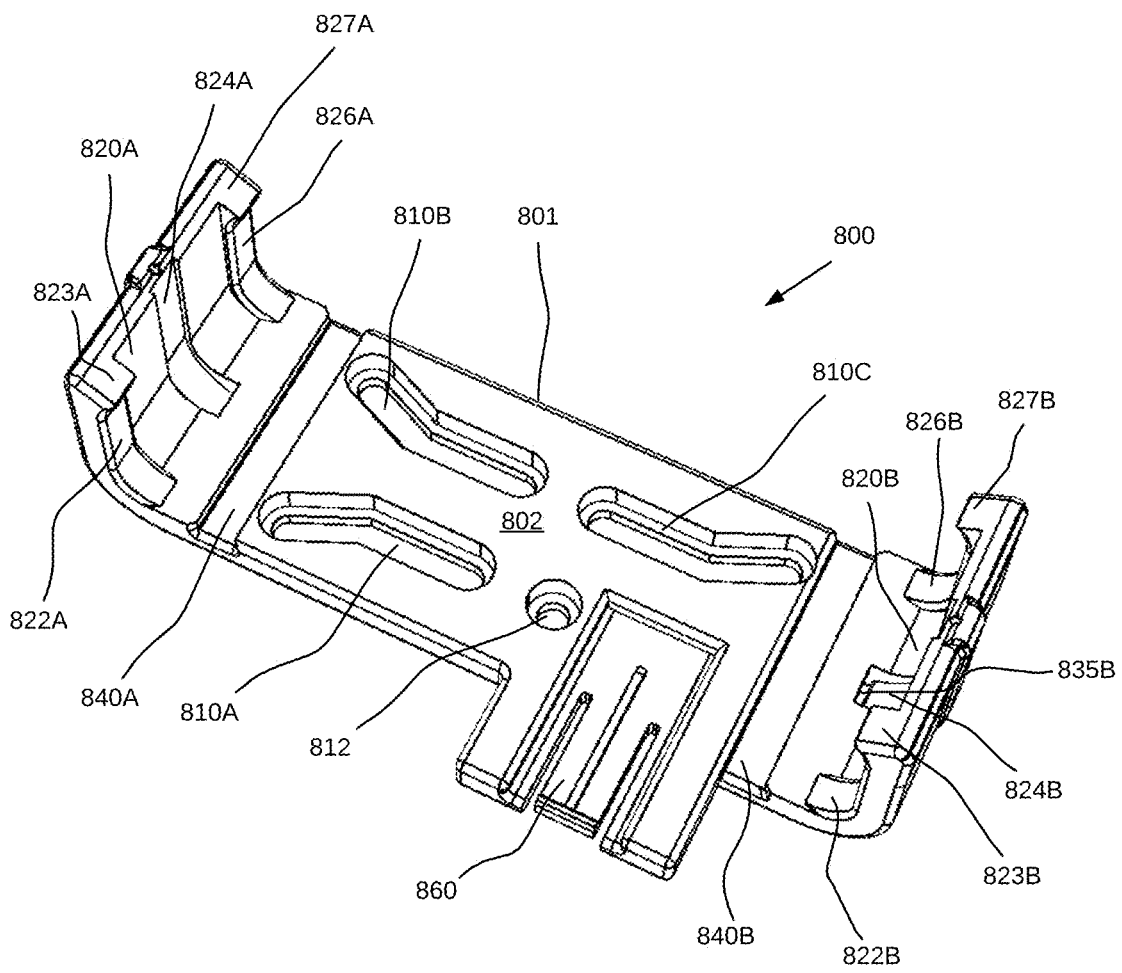
FIG. 8A is a top front right perspective view of a housing bracket configured to secure an electronic device and accommodate adjustable positioning.

FIG. 8A shows a housing bracket 800 configured to secure an electronic device and enable adjustable mounting to an asset surface. The housing bracket 800 includes a planar base 801 with elongated slots 810A, 810B, and 810C for installation adjustment, and a fastener hole 812 for fixed attachment. Left sidewall 820A and right sidewall 820B provide lateral support and feature front and rear side snaps 823A, 827A, 823B, and 827B for snap-fit engagement with the device housing. Integrated zip tie channels 824A, 824B, 840A, and 840B facilitate zip tie routing for additional retention. The bracket includes a tongue 860 for engaging a plug retainer, supporting secure and adjustable retention of peripheral connectors.

Figure 8B:
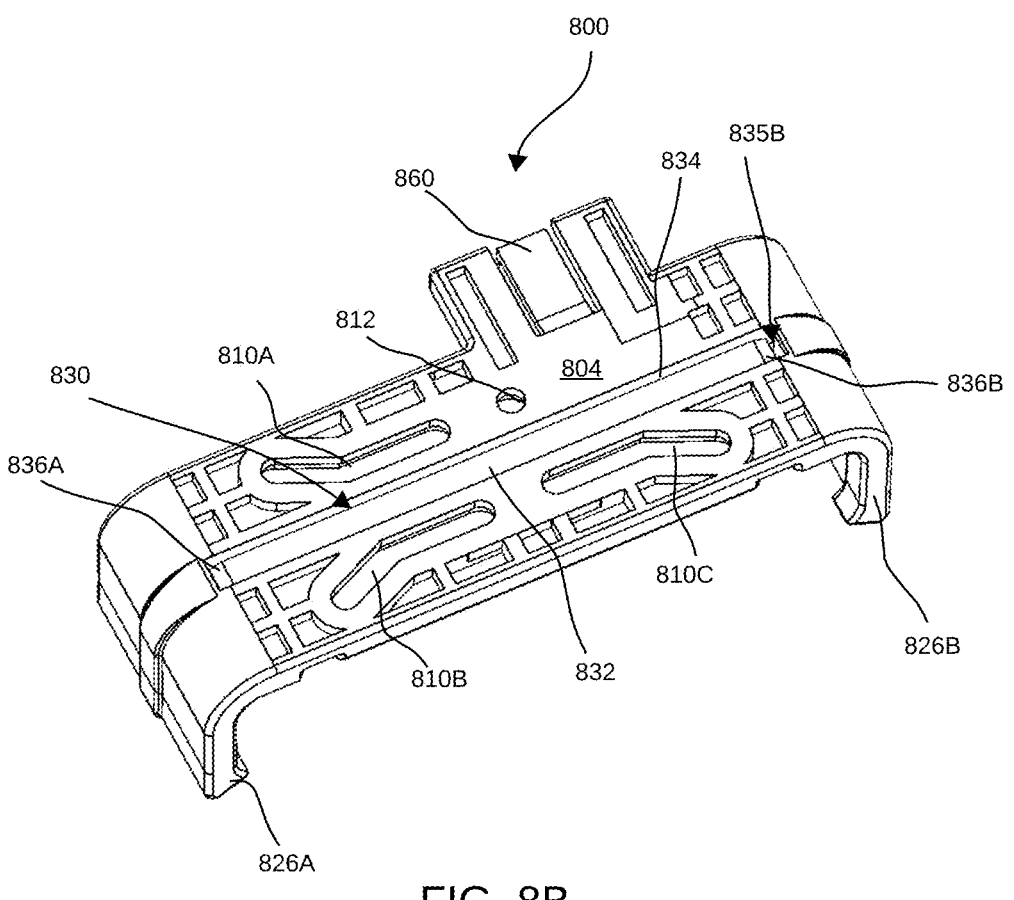
FIG. 8B is a bottom rear left perspective view of the housing bracket of FIG. 8A showcasing structural features for securing an electronic device.

FIG. 8B shows the bottom rear left perspective of the housing bracket 800, illustrating the planar base 801 with elongated slots 810A, 810B, and 810C for installation adjustment, the fastener hole 812 for fixed mounting, and the bottom zip tie channel 830 for zip tie routing. The figure highlights the tongue 860, which supports engagement with a plug retainer for adjustable plug retention, and the left rear side ridge 826A and right rear side ridge 826B for lateral support and snap-fit engagement. This configuration enables secure mounting of an electronic device and integration of retention mechanisms to resist vibration and pulling forces.

Figure 8C:
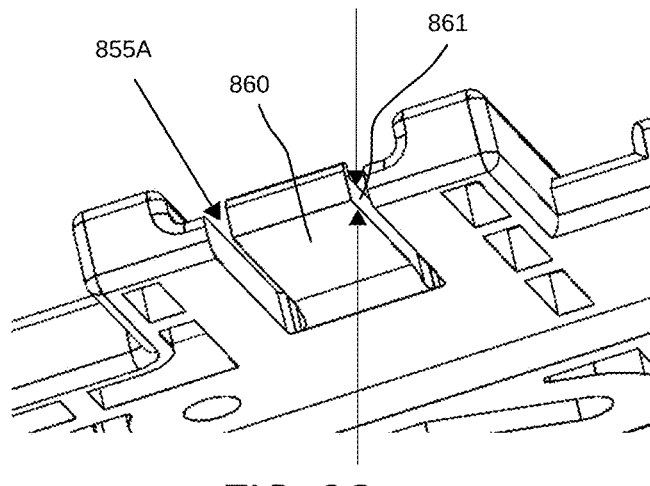
FIG. 8C is a bottom front right partial perspective view showing the housing bracket of FIG. 8A tongue and associated components for engaging a plug retainer.

FIG. 8C is a bottom front right partial perspective view of the housing bracket 800 showing the bracket groove bottom 852 with the left slot 855A and the tongue 860 projecting into the groove. A ratchet pawl 862 is formed at the distal end of the tongue 860 for engagement with a complementary ratchet rack on a plug retainer, enabling adjustable insertion and secure retention. The tongue 860 further includes a reduced thickness region 861 that facilitates elastic deflection during advancement.

Figure 8D:
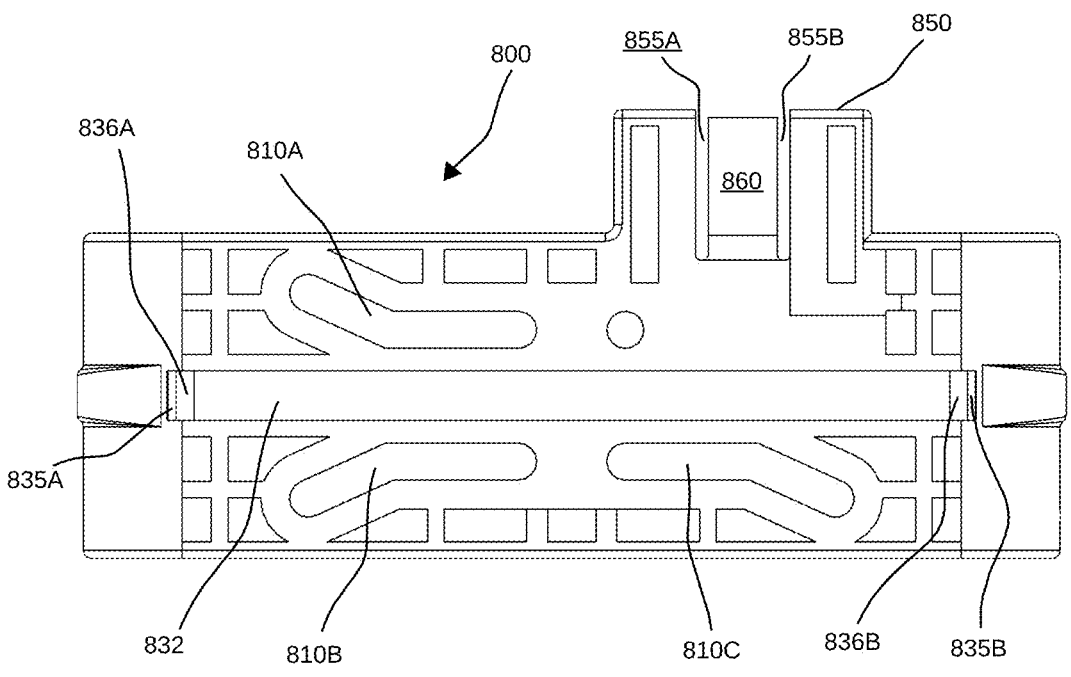
FIG. 8D is a bottom view showing the housing bracket of FIG. 8A with elongated slots and zip tie channels.

FIG. 8D is a bottom view of the housing bracket 800 showing the planar base surface 832 with elongated slots 810A, 810B, and 810C for installation adjustment. The extended base portion 850 carries the bracket groove 853 with bracket groove bottom 852 and opposed bracket groove sidewalls 854. Left and right slots 855A and 855B in the groove bottom form the tongue 860, which terminates in the ratchet pawl 862 and includes the guide ridge 864 for aligning a plug retainer. Left and right zip tie apertures 835A and 835B and corresponding channel end bevels 836A and 836B cooperate with side zip tie channels 840A and 840B to guide a zip tie through the bracket for auxiliary retention and cable management.

Figure 8E:
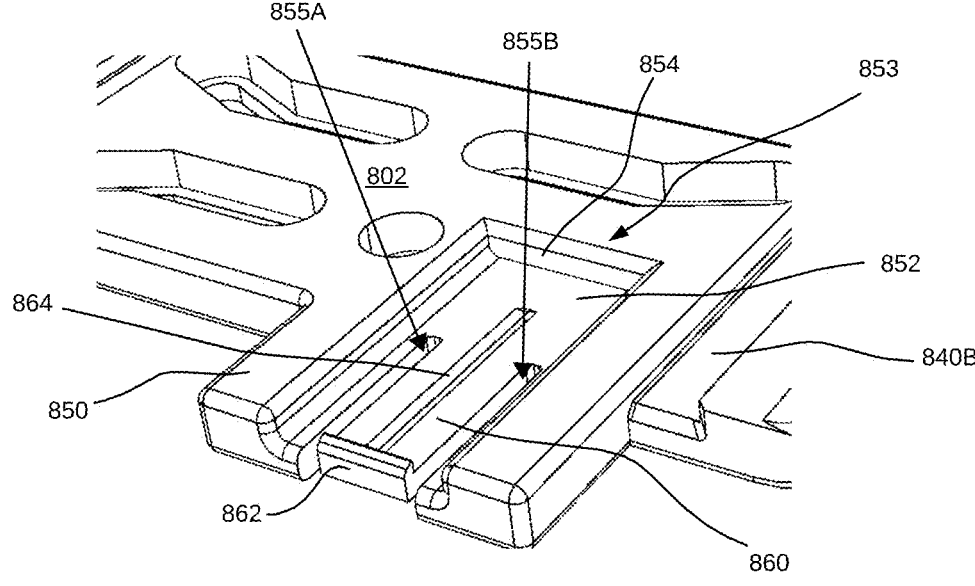
FIG. 8E is a partial top front right perspective view showing the housing bracket of FIG. 8A extended portion with a bracket groove and associated engagement features.

FIG. 8E is a partial top front right perspective view of the housing bracket 800 showing the extended base portion 850 and the bracket groove 853 with bracket groove bottom 852 and opposed bracket groove sidewalls 854. Left and right slots 855A and 855B in the groove bottom define the tongue 860, which carries the ratchet pawl 862 at its distal end. A longitudinal guide ridge 864 is formed on the tongue to align a plug retainer during insertion. The view also shows the right zip tie channel 840B adjacent to the groove, illustrating integration of retention and routing features within the bracket.

Figure 9A:
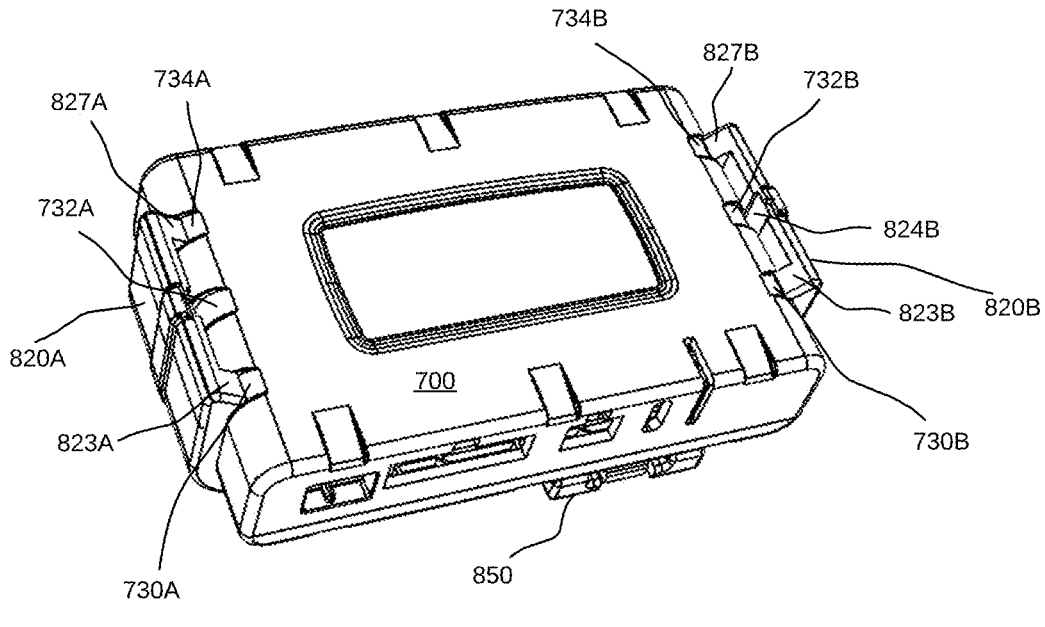
FIG. 9A is a top front left perspective view showing an electronic device secured within the housing bracket of FIG. 8A, illustrating engagement of side grooves and snap members for a secure fit.
Figure 9B:
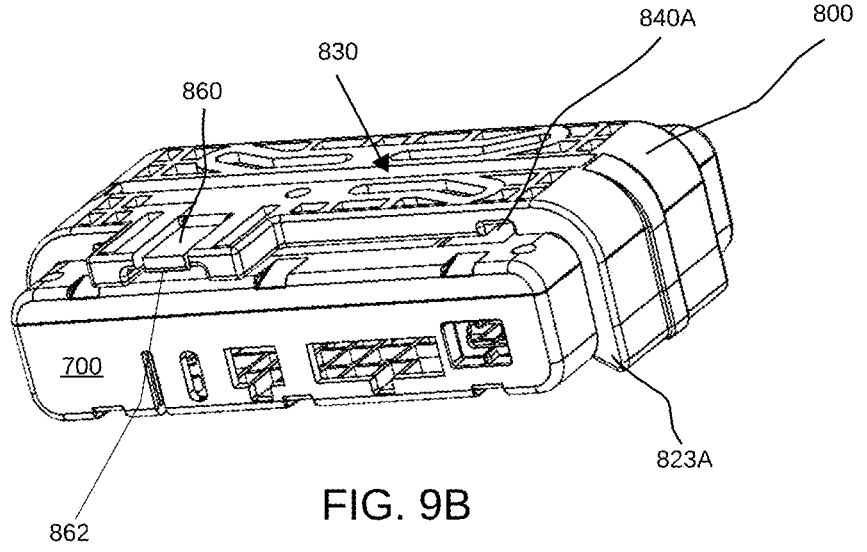
FIG. 9B is a bottom front left perspective view showing an electronic device secured within the housing bracket of FIG. 8A, illustrating engagement of side grooves and snap members for a secure fit.

FIG. 9A and FIG. 9B together show an electronic device 700 secured within the housing bracket 800, highlighting snap-fit engagement and integrated routing features. The left and right front side grooves 730A, 730B receive front side snaps 823A, 823B, and the left and right rear side grooves 734A, 734B receive rear side snaps 827A, 827B, providing a secure fit. Middle side grooves 732A, 732B are visible along the housing perimeter and serve as alignment paths for zip tie routing. The bracket's extended base portion 850 and zip tie channels—including the right side zip tie channel 824B, left zip tie channel 840A, and bottom zip tie channel 830—are arranged to guide a zip tie laterally and axially for auxiliary securing. The bracket groove region shows the tongue 860 terminating in the ratchet pawl 862, indicating the retainer support interface for adjustable plug retention. This combined view illustrates coordinated snap-fit retention, zip tie pathway integration, and readiness to engage a plug retainer.

Figure 10A:
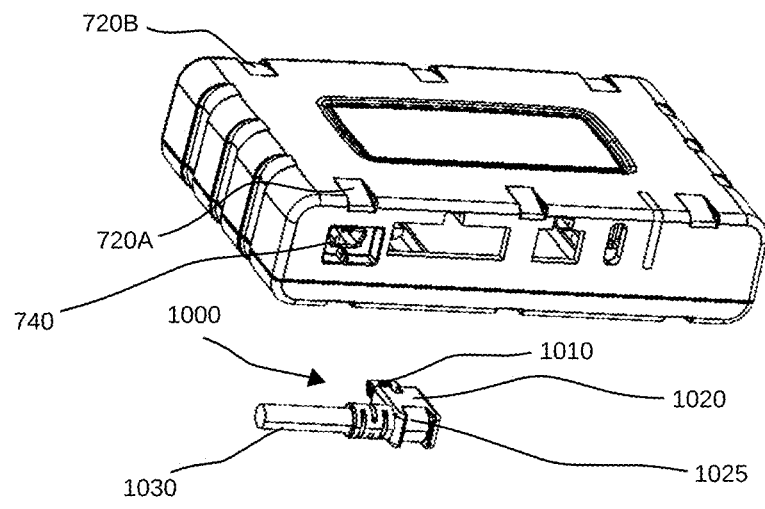
FIG. 10A is a top front left perspective view showing a mini USB plug aligned with a receptacle on an electronic device.
Figure 10B:
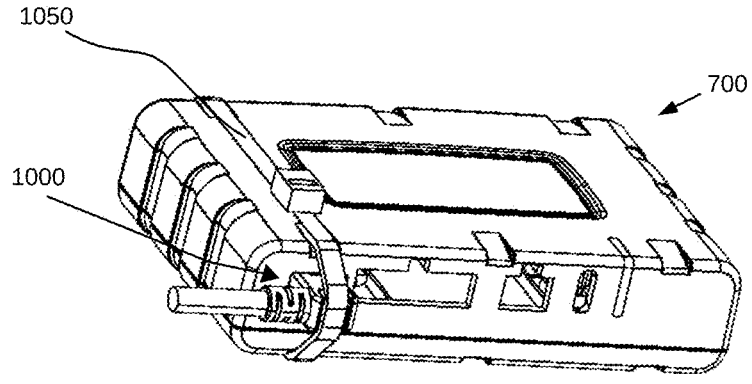
FIG. 10B is a top front left perspective view showing retention of a mini USB plug to an electronic device using a transverse zip tie.
Figure 10C:
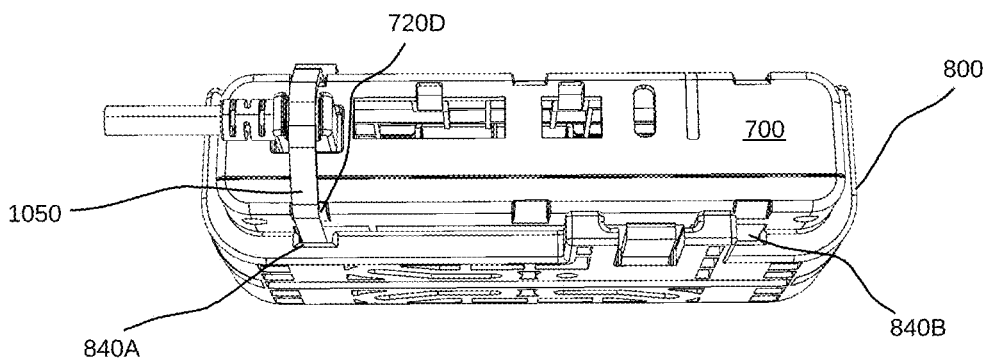
FIG. 10C is a bottom front perspective view showing integration of an electronic device, the housing bracket of FIG. 8A, and a zip tie securing mechanism.

Retaining a mini-USB plug to a mini-USB receptacle using the housing and a zip tie required a proprietary mini-USB plug whose overmold incorporates a zip tie recess sized and oriented to accept a transverse zip tie routed around the device housing. As shown in FIG. 10A, an electronic device 700 includes a mini-USB receptacle 740 on the front surface, and a custom mini-USB plug 1000 having a mini-USB plug contact 1010, a mini-USB plug overmold 1020, and a mini-USB cable 1030. The overmold 1020 carries an overmold zip tie recess 1025 positioned to face the device housing notches so that a zip tie can pass through. FIG. 10B illustrates the retention operation: the plug 1000 is mated with the receptacle 740, and a transverse zip tie 1050 is threaded through perimeter zip tie notches on the housing and through the overmold zip tie recess 1025, then tightened to clamp the plug overmold against the device, preventing unplugging under vibration or pull. FIG. 10C provides a detailed view of the assembled device 700 in the housing bracket 800, showing the transverse zip tie 1050 captured by the left bottom front zip tie notch 720D and guided along the left and right zip tie channels 840A and 840B on the bracket, demonstrating how the bracket and housing cooperate with the proprietary overmold recess to achieve secure retention without a separate plug retainer.

Figure 11:
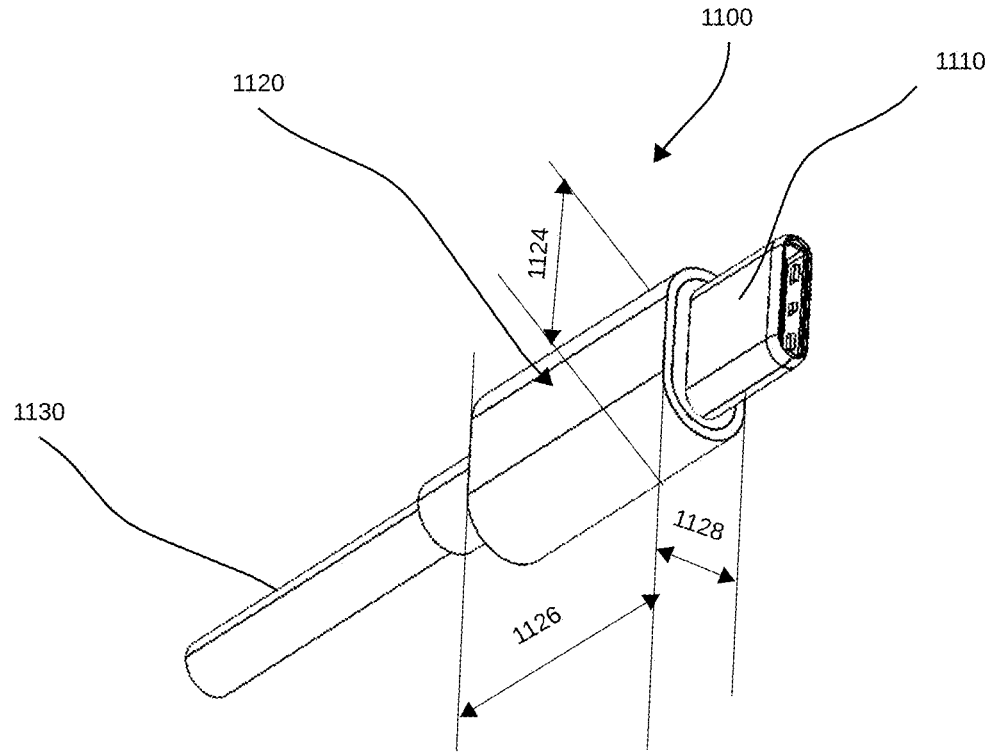
FIG. 11 is a mechanical drawing illustrating a USB-C plug with the overmold dimensions, including width, height, and depth.

The approach shown in FIG. 10A, FIG. 10B, and FIG. 10C relies on a proprietary mini-USB plug whose overmold includes a dedicated zip tie recess; off-the-shelf connectors typically lack such a feature, so a transverse zip tie cannot be routed through the plug overmold to clamp the plug against the device housing. FIG. 11 illustrates a commonly used plug 1100 whose overmold 1120 does not include a zip tie recess, with typical width 1124, height 1128, and depth 1126 dimensions but no through-aperture or relief for a zip tie, underscoring why the FIG. 10A-10C approach is unsuitable for standard connectors. To address this limitation, the inventors developed a universal plug retention mechanism that secures plugs without requiring any custom overmold geometry, using a housing bracket 800 with an adjustable plug retainer 1200 that locks by orientation and position and can be supplemented by bracket-integrated zip tie channels and retainer apertures, thereby accommodating varied overmold sizes and providing robust resistance to vibration, shock, and pulling forces. The plug retainer 1200 will be described with reference to FIGS. 12A, 12B, 12C, 12D, and 12E.

Figure 12A:
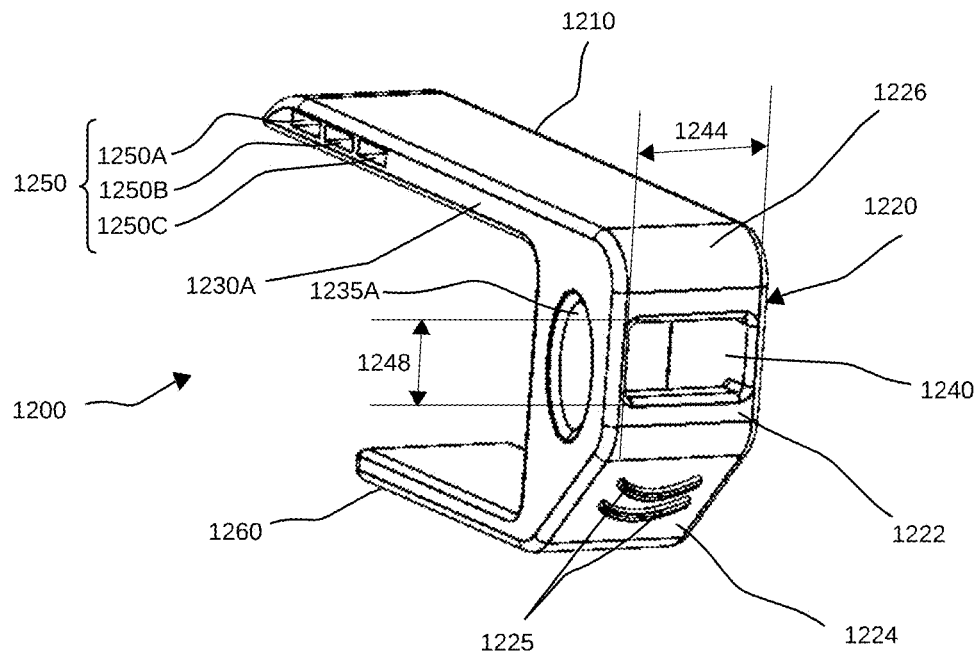
FIG. 12A is top front left perspective view a USB-C plug retainer configured to secure a USB-C plug with varying overmold dimensions.

FIG. 12A is a top front left perspective view of a plug retainer 1200 configured to secure a plug with varying overmold dimensions. The retainer includes an upper wall 1210, a front wall 1220 with a front wall upright portion 1222 and a front wall inclined portion 1224, and a lower wall 1260. A front wall aperture 1240 with defined aperture width 1244 and aperture height 1248 admits an overmold in a first orientation and retains it after rotation. External gripping ribs 1225 on the front wall and side holding recesses 1235A on the left retainer surface 1230A facilitate manual installation and removal. Along the upper wall, a plurality of zip tie apertures 1250—specifically a large overmold depth aperture 1250A, a medium overmold depth aperture 1250B, and a small overmold depth aperture 1250C—are positioned at different distances from the front wall aperture to accommodate different overmold depths. The retainer lower wall bottom surface 1270 forms the interface with a housing bracket.

Figure 12B:
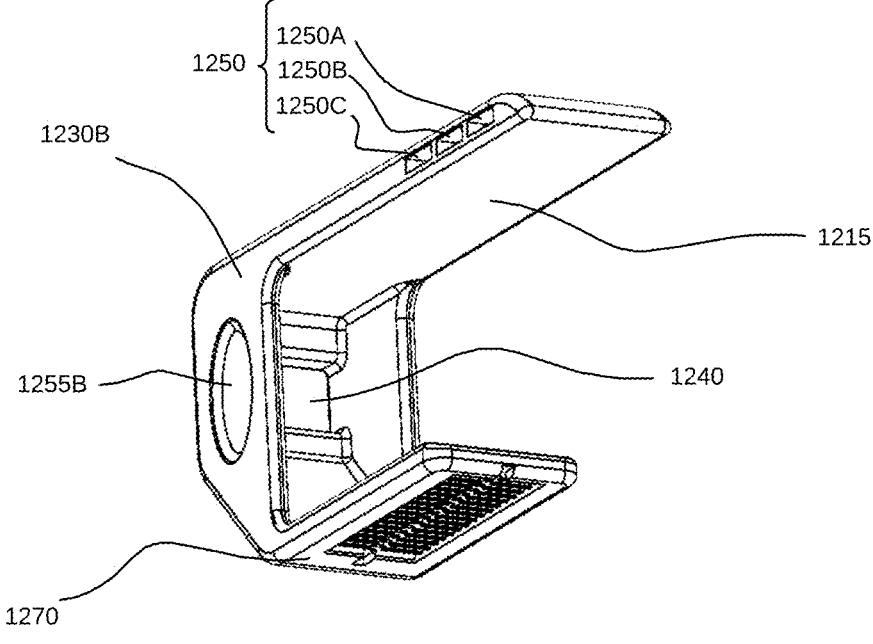
FIG. 12B is bottom rear right perspective view of the USB-C plug retainer of FIG. 12A.

FIG. 12B is a bottom rear right perspective view of the plug retainer showing internal and underside features. The upper wall 1215 carries the zip tie apertures 1250A, 1250B, and 1250C for axial zip tie routing. The front wall aperture 1240 is visible from the rear to illustrate the capture geometry relative to internal guide features. The retainer lower wall bottom surface 1270 presents the mating region toward a bracket groove, and the right retainer surface 1230B includes a right holding recess 1235B for finger grip during insertion. Together, FIGS. 12A and 12B depict the ergonomic gripping features, orientation-based overmold capture, and zip tie aperture placement that enable universal retention across plugs with different overmold depths.

FIGS. 12C, 12D, and 12E illustrate detailed views of the retainer bottom groove and ratchet interface of the plug retainer 1200. FIG. 12C shows the lower wall 1260 with the retainer bottom groove 1272 defined by a bottom groove surface 1273 and opposed bottom groove sidewalls 1274. Within the groove, a ratchet rack 1290 comprises multiple ratchet ribs 1280 arranged in parallel, each rib presenting a sloped front surface 1282, a top surface 1284, and an upright rear surface 1288. Front and rear guiding notches 1276 and 1278 are formed to cooperate with a longitudinal guide ridge on the bracket tongue for aligned insertion. FIG. 12D provides a close-up of the leading end of the ratchet ribs 1280, highlighting the sloped front surface 1282, the top surface 1284, and a ratchet rib guiding notch 1286 adjacent to the front guiding notch 1276 to facilitate smooth advancement of the bracket pawl. FIG. 12E presents a close-up of the trailing end of the ratchet ribs 1280 adjacent to the rear guiding notch 1278, emphasizing the upright rear surface 1288 that resists withdrawal after the pawl seats behind a rib. Together, these views show how the guiding notches and asymmetric rib geometry enable precise alignment, incremental advancement, and secure anti-backout engagement with the bracket's ratchet pawl.

Figure 13A:
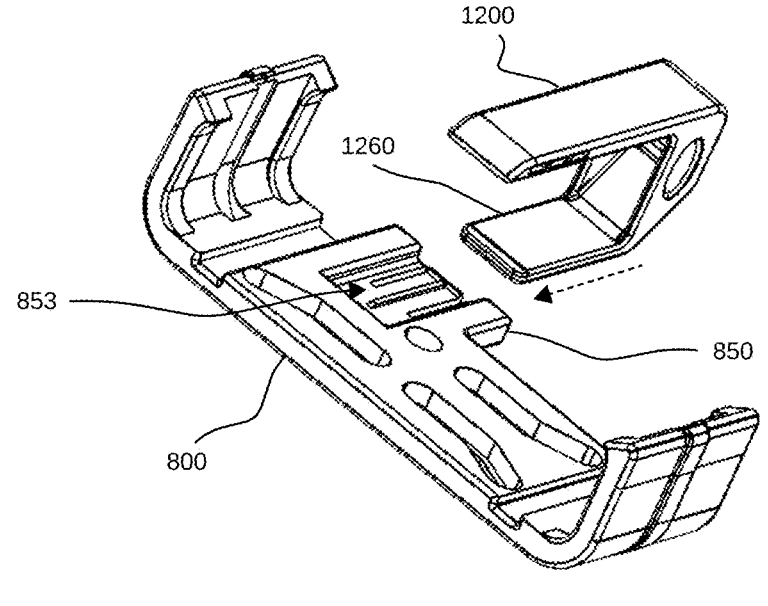
FIG. 13A is a top rear right perspective view showing the USB-C plug retainer being installed into the groove of the housing bracket.
Figure 13B:
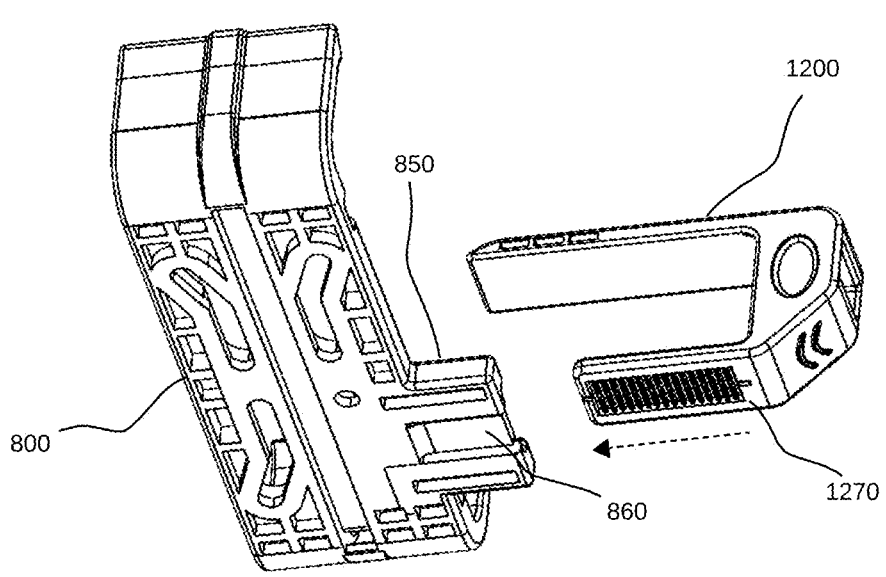
FIG. 13B is a bottom left perspective view showing the assembly components with the ratchet exposed.

FIG. 13A shows the plug retainer 1200 aligned with the bracket groove 853 on the extended base portion 850 of the housing bracket 800, with the retainer lower wall 1260 oriented toward the groove for insertion. The front wall aperture 1240 faces the electronic device so that, after the plug is oriented and mated, the retainer can be advanced along the groove axis. FIG. 13B provides a bottom-left perspective of the assembly, revealing the tongue 860 within the bracket groove and the retainer lower wall bottom surface 1270 positioned to slide over the groove bottom 852. As the retainer 1200 is pushed into the groove, the longitudinal guide ridge 864 on the tongue aligns with the retainer guiding notches to constrain motion, and the ratchet pawl 862 rides over successive ratchet ribs until seating behind a rib, thereby positionally locking the retainer relative to the bracket. This insertion sequence establishes an adjustable, vibration-resistant engagement ready to retain the plug without relying on custom overmold features.

Figures 14A, 14B, 14C, 14D:
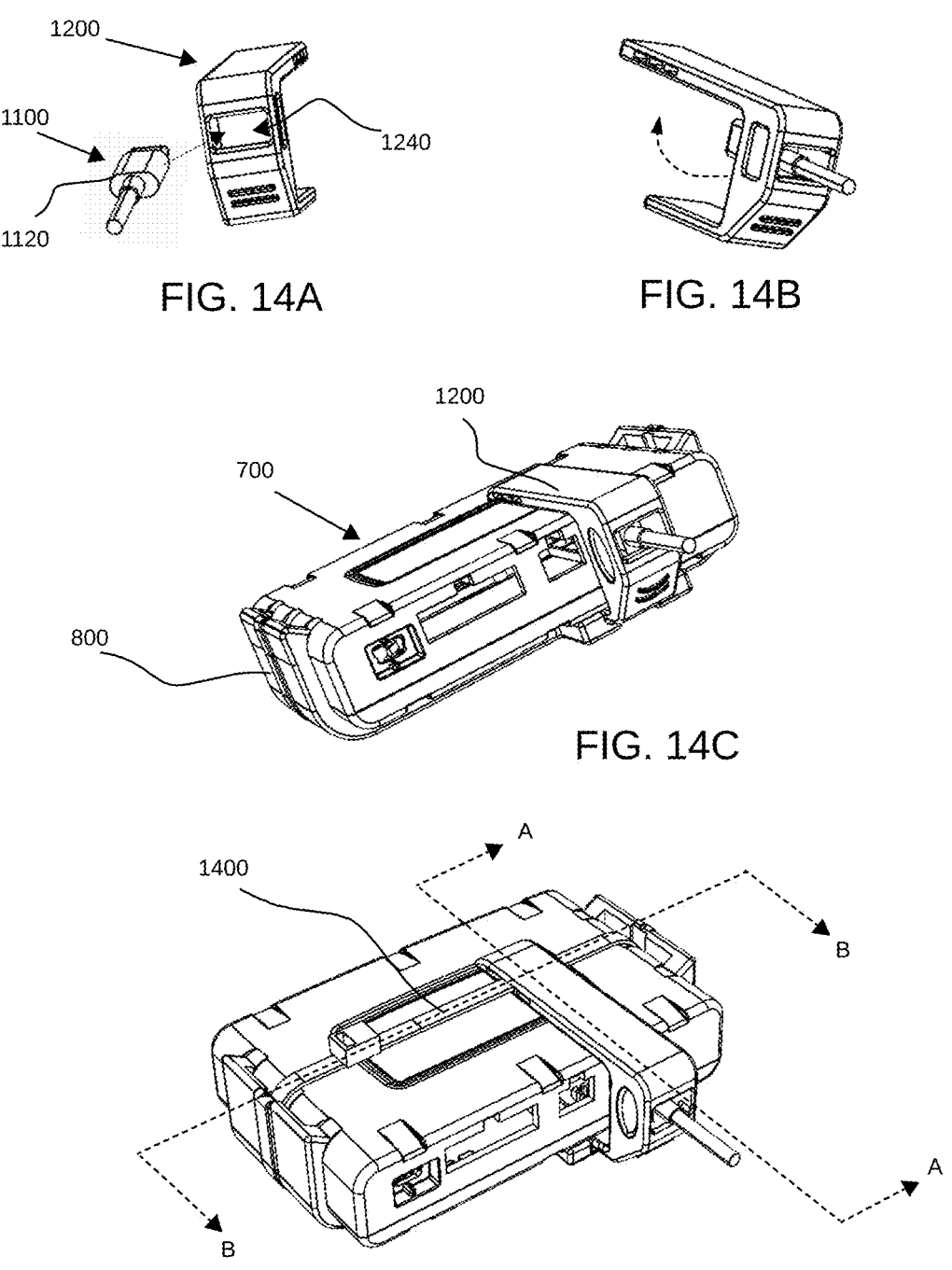
FIG. 14A is a top front right perspective view showing the insertion of a USB-C plug into the USB-C plug retainer of FIG. 12A.
FIG. 14B is a top front left perspective view showing the rotation of a USB-C plug within the USB-C plug retainer of FIG. 12A to secure the plug.
FIG. 14C is a top front left perspective view showing an electronic device secured within the housing bracket of FIG. 8A and retained by the USB-C plug retainer of FIG. 12A.
FIG. 14D is a top front left perspective view showing an electronic device secured within the housing bracket of FIG. 8A, with the USB-C plug retainer of FIG. 12A and an axial zip tie in place.

FIGS. 14A-14D illustrate an exemplary retention of a USB-C plug 1100 into a USB-C receptacle 770 using the plug retainer 1200 and the housing bracket 800. In FIG. 14A, the USB-C plug overmold 1120 is passed through the front wall aperture 1240 of the plug retainer 1200 in a first orientation that aligns the largest cross-sectional dimension of the overmold with the aperture width 1244. As shown in FIG. 14B, the plug 1100 is then rotated approximately 90 degrees so that the largest cross-sectional dimension aligns with the aperture height 1248, preventing withdrawal of the overmold 1120 through the aperture 1240. With the plug captured in the retainer, FIG. 14C depicts mating of the plug 1100 with the device receptacle 770 while the retainer 1200 is advanced into the bracket groove 853 of the housing bracket 800, allowing the retainer's lower wall 1260 to seat against the groove bottom 852 and establish positional lock relative to the device. FIG. 14D shows the assembly with an axial zip tie 1400 routed through a selected zip tie aperture 1250 on the retainer and through bracket zip tie channels, providing auxiliary confinement that prevents front-to-back translation of the retainer and augments retention under vibration and pull, thereby maintaining the plug 1100 securely engaged with the receptacle 770 during operation.

Figure 14E:
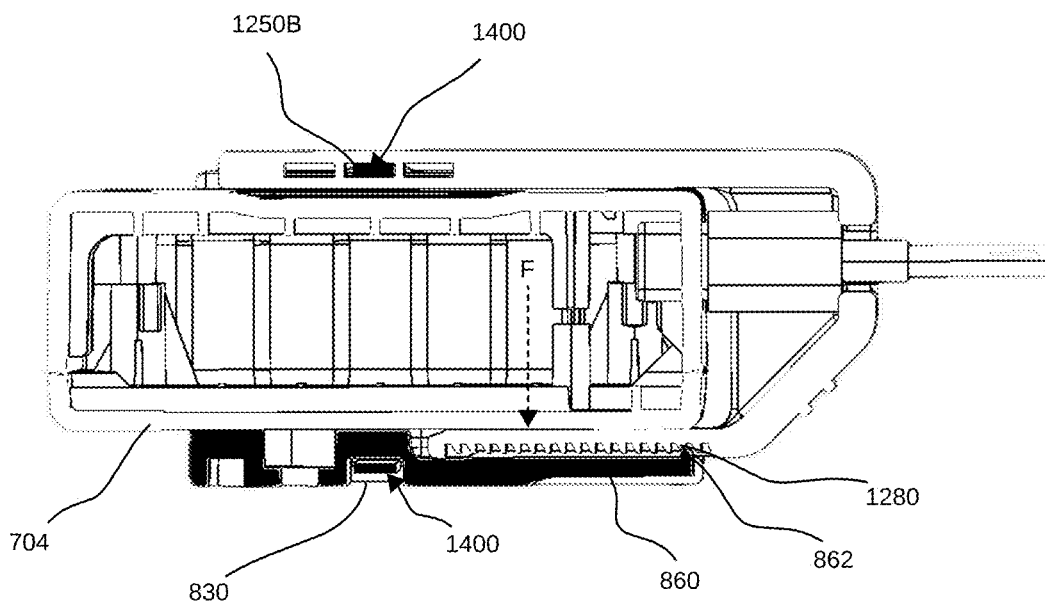
FIG. 14E is a cross-sectional mechanical drawing taken at the line A-A of FIG. 14D illustrating the engagement between the ratchet pawl and ratchet ribs, the force exerted by the electronic device housing, and the positioning of the axial zip tie within the medium overmold depth aperture.

FIG. 14E is a cross-sectional mechanical drawing taken at the line A-A of FIG. 14D illustrating the engagement between the ratchet pawl 862 and the ratchet ribs 1280, the force F exerted by the electronic device housing bottom surface 704 on the upper surface of the retainer lower wall, and the positioning of the axial zip tie 1400 within the medium overmold depth aperture 1250B. The view shows the tongue 860 guiding the retainer along the bracket groove bottom 852, with the pawl seated behind a ratchet rib to resist withdrawal. The zip tie 1400 is depicted routed axially across the retainer, cooperating with bracket channels to confine the assembly and maintain positional lock under vibration.

Figure 14F:
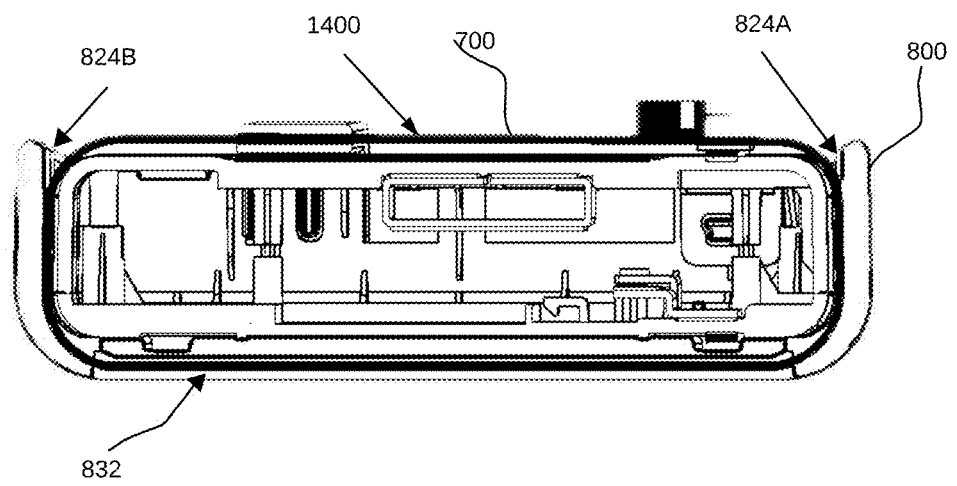
FIG. 14F is a cross-sectional mechanical drawing taken at the line B-B of FIG. 14D illustrating the internal view of the electronic device secured within the housing bracket of FIG. 8A, showing the engagement of the axial zip tie with the left and right zip tie channels and the bottom zip tie channel.

FIG. 14F is a cross-sectional mechanical drawing taken at the line B-B of FIG. 14D, illustrating the internal view of the electronic device 700 secured within the housing bracket 800. The axial zip tie 1400 is shown routed through the left and right zip tie channels 824A and 824B and across the bottom zip tie channel surface 832, demonstrating how the channels laterally confine the zip tie and resist displacement under vibration. This configuration cooperates with the bracket geometry to prevent front-to-back translation of the retainer and maintain the assembly's positional stability during operation.

Figure 15:
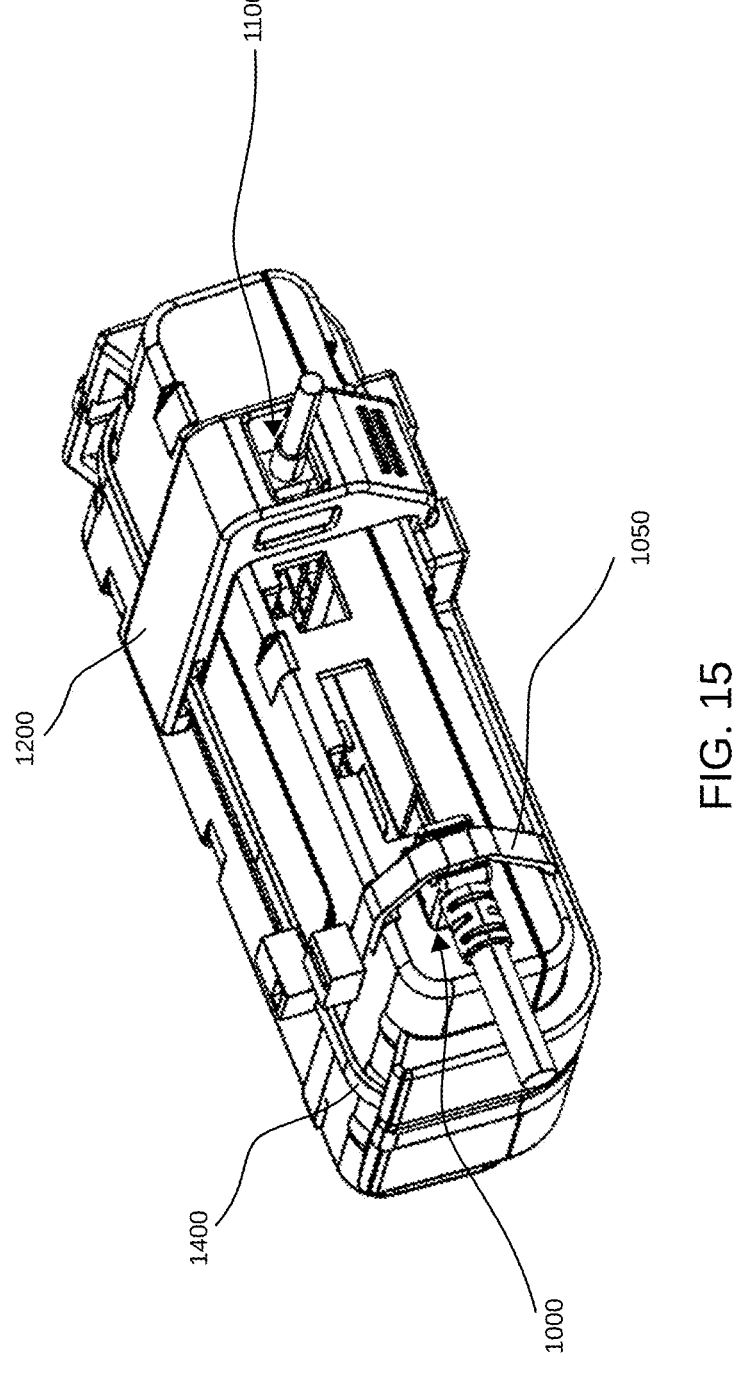
FIG. 15 is a top front left perspective view showing the assembly of the USB-C plug retainer, housing bracket, and associated securing components.

The universal plug retention mechanism described with reference to FIGS. 14A-14F can be combined with the zip tie-based retention employed by a custom plug overmold as shown in FIGS. 10A and 10B, enabling simultaneous positional locking of a plug retainer 1200 and transverse clamping of a proprietary overmold recess 1025 for enhanced robustness under vibration and pull. FIG. 15 illustrates an assembly having both approaches: the universal plug retention mechanism engages and locks the plug retainer 1200 relative to the housing bracket 800 and electronic device 700, while a transverse zip tie 1050 passes through the custom overmold recess 1025 and perimeter notches 720A-720D on the device housing 701, thereby providing dual retention that maintains plug engagement between the plug 1100 and the receptacle 770 and resists displacement during operation.

Figure 16A:
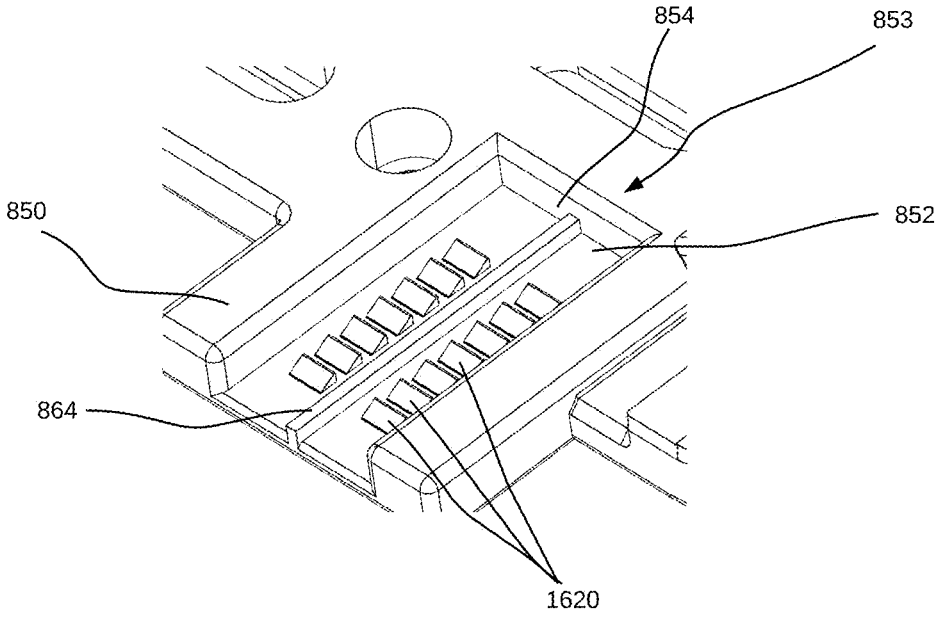
FIG. 16A is a top front right partial perspective view showing the bracket groove and components of the housing bracket of FIG. 8A, including angled teeth for engagement with a plug retainer.

In addition to the ratchet-based engagement, the inventors have contemplated alternate embodiments as described with reference to FIG. 16A-16B and FIG. 17A-17B, each providing discrete, adjustable positioning and withdrawal resistance under vibration and pull. FIG. 16A is a detailed top-front-right partial perspective view of the housing bracket 800 showing an extended base portion 850 that carries a bracket groove 853. The bracket groove 853 is defined by a bracket groove bottom 852 and opposed bracket groove sidewalls 854. Formed on the bracket groove bottom 852 is a plurality of bracket angled teeth 1620 arranged in parallel along the groove axis. A longitudinal guide ridge 864 is provided to align a mating plug retainer during insertion. The angled teeth 1620 present a ramped lead-in face configured to allow insertion advancement by sliding toward the electronic device 700, and a steeper backstop face configured to resist reverse motion and withdrawal, thereby establishing incremental positional locking along the groove.

Figure 16B:
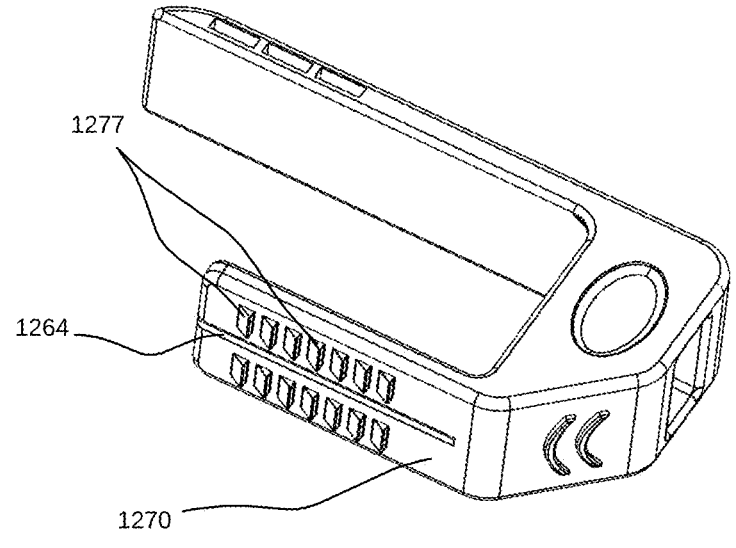
FIG. 16B is a bottom front left perspective view showing a USB-C plug retainer featuring retainer bottom groove angle teeth configured for engagement with bracket angled teeth.

FIG. 16B is a complementary bottom-front-left perspective view of the plug retainer 1200 showing features that mate with the bracket of FIG. 16A. The retainer includes a lower wall bottom surface 1270 sized to seat within the bracket groove 853. Along the lower wall, a plurality of retainer bottom groove angled teeth 1277 are formed to complement the bracket angled teeth 1620. A retainer bottom guide slot 1264 aligns with the bracket guide ridge 864 to constrain motion along the insertion axis. During assembly, the angled teeth 1277 slide up the ramp faces of teeth 1620 to advance the retainer 1200 toward the electronic device 700 and seat against the backstop faces, thereby resisting withdrawal while enabling fine positional adjustment without a separate ratchet pawl.

Figure 17A:
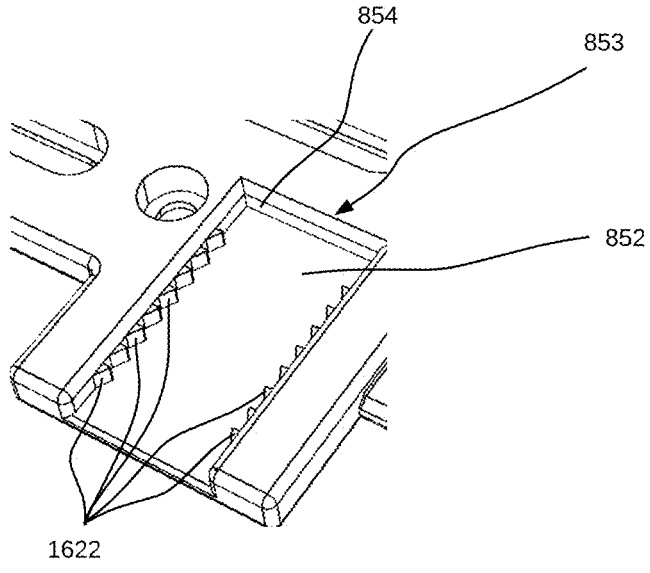
FIG. 17A is a top front right partial perspective view showing a bracket groove of the housing bracket of FIG. 8A with sidewall teeth for engaging a plug retainer.

FIG. 17A is a detailed top-front-right partial perspective view of the housing bracket 800 illustrating a side-engagement embodiment. The bracket groove 853 again includes a bracket groove bottom 852 and opposed bracket groove sidewalls 854. Formed on the inner faces of the sidewalls 854 is a plurality of bracket groove sidewall teeth 1622 oriented to permit incremental advancement toward the electronic device 700 while resisting withdrawal and reverse motion. This tooth arrangement provides discrete lateral indexing points that cooperate with resilient features on the plug retainer.

Figure 17B:
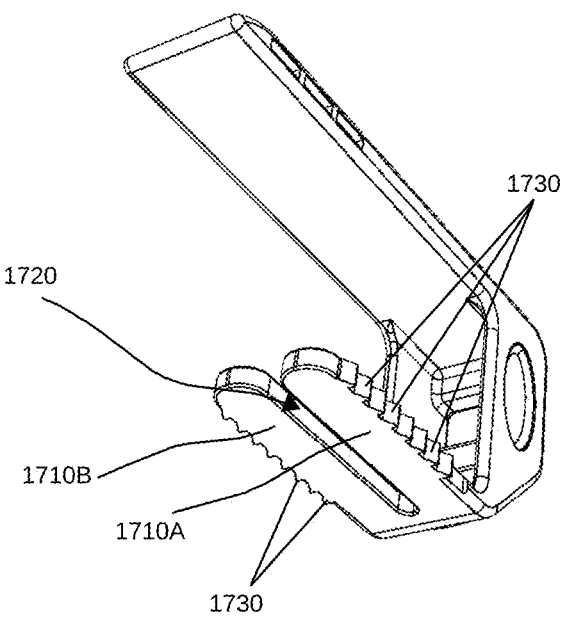
FIG. 17B is a bottom front left perspective view showing a USB-C plug retainer with lower fingers featuring outer teeth engaging with sidewall teeth of a bracket groove.

FIG. 17B is a bottom-front-left perspective view of the plug retainer 1200 configured for side-to-side tooth engagement with the bracket of FIG. 17A. The retainer lower wall is divided into a left lower finger 1710A and a right lower finger 1710B separated by a retainer lower wall slot 1720. Each finger carries outwardly facing finger teeth 1730 that are shaped to mate with the bracket groove sidewall teeth 1622. The fingers 1710A, 1710B are resilient, allowing inward flex on lead-in engagement and outward snap-back into the bracket sidewall teeth to lock position and resist reverse motion. The combination of resilient finger geometry, outwardly facing finger teeth 1730, and bracket sidewall teeth 1622 provides adjustable insertion with discrete stops and robust anti-withdrawal performance under vibration, supplementing or replacing bottom-surface tooth or ratchet-based engagements as desired.

FIG. 18 shows a flowchart 1800 illustrating a method for securing a plug 1100 to an electronic device 700 using a housing bracket 800 and a plug retainer 1200. In step 1810, the electronic device housing 701 is inserted into the housing bracket 800 by sliding the device between opposing side walls until the snap members 823A, 823B, 827A, and 827B engage the complementary side grooves 730A, 730B, 732A, 732B, 734A, and 734B, thereby retaining the device by a snap fit. In step 1820, an overmold of the plug 1120 is passed through the front wall aperture 1240 of the plug retainer 1200 in a first orientation, allowing the overmold to be insertable through the aperture. Step 1830 involves rotating the plug 1100 to a second orientation in which the overmold 1120 is no longer removable through the front wall aperture 1240, thereby capturing the plug within the retainer 1200. In step 1840, the plug 1100 is mated with a receptacle 770 of the electronic device 700 to establish electrical and mechanical connection. In step 1850, the plug retainer 1200 is slid into the bracket groove 853 of the housing bracket 800, positionally locking the retainer relative to the device and securing the plug 1100 against vibration and pulling forces. This method enables robust, adjustable retention for plugs with varying overmold dimensions and supports reliable operation in dynamic environments.

In one aspect of the present disclosure, there is provided a universal plug retention mechanism comprising a housing bracket 800 configured to attach to an electronic device housing 701 and provide a plug retainer support interface in the region of a bracket groove 853, a plug retainer 1200 configured to secure a plug 1100 to the electronic device 700 and to accommodate plugs with varying overmold sizes via a front wall aperture 1240 and zip tie apertures 1250A-1250C, and an engagement mechanism including elements such as a ratchet pawl 862, ratchet ribs 1280, bracket groove sidewall teeth 1622, resilient fingers 1710A, 1710B, finger teeth 1730, and angled teeth 1620, 1277, configured to permit advancement of the plug retainer 1200 toward the electronic device 700 while resisting withdrawal to provide discrete, adjustable positioning of the plug retainer relative to the housing bracket 800 and secure the plug retainer against movement during vibration or pull to maintain the plug engaged with the device (see FIGS. 8A-8E, 7A-7B, 12A-12E, 16A-16B, 17A-17B). This ensures robust, adjustable retention across diverse overmold geometries without custom plugs or cables.

The engagement mechanism may comprise a ratchet rack 1290 including a plurality of parallel ratchet ribs 1280 each having a sloped leading surface 1282 and an upright trailing surface 1288 to allow insertion adjustment of the plug retainer 1200 toward the electronic device 700 while resisting withdrawal (see FIGS. 12C-12E, 14E). This secures one-way incremental positioning with strong anti-backout performance.

The plug retainer support interface may include a tongue 860 projecting into a bracket groove 853, and a ratchet pawl 862 may be formed at a distal end of the tongue 860 (see FIGS. 8C-8E, 13A-13B). This improves latch compactness and strength while simplifying molding.

The tongue 860 may further comprise a longitudinal guide ridge 864 and the plug retainer 1200 may comprise a retainer bottom groove 1272 with front and rear guiding notches 1276, 1278 sized to slidingly receive the guide ridge 864 (see FIGS. 8E, 12C). This ensures constrained, aligned insertion and reduces misalignment.

The retainer bottom groove 1272 may be comprised of a plurality of notches 1276, 1278 formed on a top wall of a plurality of ratchet ribs 1280 (see FIGS. 12C-12E). This improves guidance and distributes contact stress across ribs for durable engagement.

The bracket groove 853 may include a plurality of bracket groove sidewall teeth 1622 on opposed bracket groove sidewalls 854, and a plug retainer lower wall 1260 may comprise left and right resilient fingers 1710A, 1710B separated by a longitudinal slot 1720, each finger having outwardly facing finger teeth 1730 that are engageable with the bracket groove sidewall teeth 1622 to provide discrete, adjustable positioning of the plug retainer 1200 relative to the housing bracket 800 by side-to-side tooth engagement (see FIGS. 17A-17B). This secures an alternative, self-biasing lock tolerant of dimensional variation.

The bracket groove sidewall teeth 1622 and the outwardly facing finger teeth 1730 may each comprise an asymmetric tooth profile having a sloped leading face and an upright trailing face to permit advancement toward the electronic device 700 while resisting withdrawal (see FIGS. 17A-17B). This ensures smooth insertion coupled with strong anti-reverse locking.

The outwardly facing finger teeth 1730 on left and right resilient fingers 1710A, 1710B of the plug retainer 1200 may have mismatched lead-in angles such that initial engagement causes inward flex followed by outward snap-back to a locked position that resists reverse motion (see FIG. 17B). This improves controlled seating and vibration robustness.

A bottom of the bracket groove 853 may include a plurality of angled teeth 1620 and a plug retainer lower wall 1260 may include complementary angled teeth 1277, the angled teeth being configured to permit insertion advancement by ramp sliding toward the electronic device 700 while resisting withdrawal by a backstop angle (see FIGS. 16A-16B). This simplifies the mechanism while maintaining strong anti-withdrawal behavior.

A lead-in angle of the angled teeth 1620, 1277 may be between 20 degrees and 45 degrees and a backstop angle may be between 80 degrees and 95 degrees (see FIGS. 16A-16B). This balances insertion effort with retention strength.

The plug retainer 1200 may include a front wall aperture 1240 dimensioned to admit a plug overmold 1120 in a first orientation and to retain the plug overmold after rotation to a second orientation approximately 90 degrees from the first orientation (see FIGS. 12A, 14A-14B). This ensures capture of standard overmolds without custom recesses.

When the electronic device 700 is installed in the housing bracket 800, a bottom surface 704 of the device housing 701 may bear against an upper surface of a lower wall 1260 of the plug retainer 1200 to apply a force that maintains engagement between the housing bracket 800 and the plug retainer 1200 during vibration or pulling forces, thereby securing the plug retainer against movement relative to the housing bracket and maintaining the plug engaged with the device (see FIG. 14E). This secures preload using existing structure to improve retention.

The plug retainer 1200 may include a plurality of zip tie apertures 1250A-1250C positioned at different distances from the front wall aperture 1240 to accommodate different overmold depths (see FIG. 12A). This improves tie routing consistency and flexible retention across plug variants.

A zip tie 1400 may be routed through zip tie channels 824A, 824B, 830 of the housing bracket 800 and through a selected one of the zip tie apertures 1250 of the plug retainer 1200, the zip tie preventing front-to-back translation of the retainer relative to the housing bracket (see FIGS. 8D, 14F). This stabilizes the assembly under high-vibration conditions.

The housing bracket 800 may include a left side zip tie channel 824A and a right side zip tie channel 824B each configured to laterally confine the zip tie 1400 and resist displacement under vibration (see FIGS. 8A-8D, 14F). This prevents tie migration and abrasion, improving durability.

The housing bracket 800 may include a self-feeding zip tie channel arranged to guide a zip tie 1400 from a first side of the bracket to an opposite side even when the bracket is flush-mounted to a surface, the self-feeding zip tie channel being comprised of the left side zip tie channel 824A and the right side zip tie channel 824B and a bottom zip tie channel 830 formed axially on a bottom surface 832 of the housing bracket (see FIGS. 8B, 8D, 14F). This enables blind routing and reduces installation effort and errors.

The housing bracket 800 may further include snap members 823A, 823B, 827A, 827B on opposite side walls 820A, 820B configured to engage complementary side grooves 730A, 730B, 734A, 734B on the electronic device 700 to retain the bracket to the device by a snap fit (see FIGS. 8A-8B, 9A-9B). This enables fast, tool-less mounting and removal.

At least one of the bracket side walls 820A, 820B may be resiliently deflectable outward during insertion of the electronic device 700 and may return inward to engage the side grooves after insertion (see FIGS. 8A-8B, 9A-9B). This tolerates dimensional variability while maintaining strong retention.

A transverse zip tie path may be configured to secure a plug having an overmold recess 1025 to a receptacle 770 of the electronic device 700, the path being defined by housing notches 720A-720D (see FIGS. 7A, 10A-10C, 15). This enables dual-retention strategies for maximum robustness.

The bracket groove 853 receiving the plug retainer 1200 may be formed in an extended portion 850 of the housing bracket 800 and may have a rectangular cross-section with opposed sidewalls 854 guiding insertion of the plug retainer (see FIGS. 8E, 13A-13B). This improves insertion guidance and alignment while allowing flexible bracket placement.

The engagement mechanism may be configured to permit incremental advancement toward the electronic device 700 of less than 1 millimeter per tooth to fine-tune retainer position with respect to overmold depth (see FIGS. 12D-12E, 14E). This ensures precise axial fit across different plugs and batches.

The ratchet pawl 862 may be integrally molded with the housing bracket 800 and may include a resilient hinge region 861 enabling elastic deflection during advancement of the plug retainer 1200 (see FIG. 8C). This reduces part count and assembly complexity while ensuring reliable engagement.

Rotation from the first orientation to the second orientation may be within a range of 70 degrees to 110 degrees for the overmold 1120 relative to the aperture 1240 (see FIGS. 14A-14B). This broadens compatibility with varied overmold aspect ratios and insertion clearances.

An interference fit between the bottom surface 704 of the device housing 701 and the upper surface of the lower wall 1260 of the plug retainer 1200 may be configured to maintain engagement between the housing bracket 800 and the plug retainer 1200 (see FIG. 14E). This adds frictional preload that improves anti-backout performance.

A right zip tie channel 824B and a left zip tie channel 824A may each include a bend 836A, 836B where the respective channel meets a bracket base 832, the bend being configured to deflect a zip tie 1400 into and out of a bottom zip tie channel 830 (see FIG. 8D). This enables self-feeding routing even in flush mounts, improving installability.

At least one of the bracket side walls 820A, 820B may be resiliently deflectable outward during insertion of the electronic device 700 and returns inward to engage the side grooves after insertion (see FIGS. 8A-8B, 9A-9B). This enhances ease of installation and maintains a secure snap-fit over time.

The housing bracket 800 may further comprise a planar base 801 with elongated mounting slots 810A-810C for positional adjustment and at least one fixed fastener hole 812 to lock a final installation position (see FIGS. 8A-8D). This ensures long-term stability after alignment.

In another aspect of the present disclosure, there is provided a method for securing a plug to an electronic device using a housing bracket 800 and a plug retainer 1200, comprising inserting the electronic device 700 into the housing bracket 800 by sliding the device housing 701 between opposing side walls 820A, 820B of the housing bracket until snap members 823A, 823B, 827A, 827B on the bracket engage complementary side grooves 730A, 730B, 734A, 734B on the device to retain the device by a snap fit; passing an overmold 1120 of a plug 1100 through a front wall aperture 1240 of the plug retainer 1200 in a first orientation in which the overmold is insertable through the aperture; rotating the plug 1100 to a second orientation in which the overmold 1120 is no longer removable through the front wall aperture 1240; mating the plug 1100 with a receptacle 770 of the electronic device 700; and sliding the plug retainer 1200 into a bracket groove 853 of the housing bracket 800 to positionally lock the retainer relative to the device (see FIGS. 8A-8B, 9A-9B, 12A, 13A-13B, 14A-14C). This ensures a field-ready, tool-light procedure that reliably secures standard plugs under vibration and pull.

Sliding the plug retainer 1200 into the bracket groove 853 may comprise engaging a ratchet pawl 862 on the housing bracket 800 with a ratchet rack 1290 on the plug retainer 1200 (see FIGS. 8C, 12C-12E, 14E). This ensures one-way adjustment and strong anti-withdrawal security.

Sliding the plug retainer 1200 into the bracket groove 853 may comprise inserting a lower wall 1260 of the retainer into a rectangular bracket groove 853 until the ratchet pawl 862 rides over a plurality of ratchet ribs 1280 of the ratchet rack and seats behind at least one ratchet rib 1280 (see FIGS. 13A-13B, 14E). This provides tactile feedback and confirms positive seating for robust retention.

Sliding the plug retainer 1200 into the bracket groove 853 may comprise advancing complementary angled teeth 1277 on a lower wall 1260 of the retainer over angled teeth 1620 on a groove bottom 852 until a backstop prevents withdrawal (see FIGS. 16A-16B). This offers a predictable, pawl-free insertion with strong resistance to backout.

Sliding the plug retainer 1200 into the bracket groove 853 may comprise laterally inserting the retainer between opposed bracket groove sidewalls 854 so that outwardly facing finger teeth 1730 on resilient fingers 1710A, 1710B of the retainer engage bracket groove sidewall teeth 1622 to positionally lock the retainer (see FIGS. 17A-17B). This secures a quick-snap latch tolerant of dimensional variation.

The method for securing a plug to an electronic device may further comprise that the resilient fingers 1710A, 1710B of the plug retainer 1200 are pre-stressed inward such that lateral insertion between opposed bracket groove sidewalls 854 elastically biases outwardly facing finger teeth 1730 into engagement with bracket groove sidewall teeth 1622 (see FIG. 17B), which improves sustained locking under random vibration by maintaining tooth engagement without additional fasteners.

The method for securing a plug to an electronic device may further comprise routing a zip tie 1400 through zip tie channels 824A, 824B, 830 of the housing bracket 800 and through a selected zip tie aperture 1250 of the plug retainer 1200, and tightening the zip tie to: secure the electronic device 700 to the housing bracket 800; and prevent front-to-back translation of the retainer by engagement between sidewalls of the bracket channels and sidewalls of the selected zip tie aperture (see FIGS. 8D, 12A, 14F). This adds a secondary restraint that stabilizes the assembly in high-vibration conditions.

Routing the zip tie may comprise inserting the zip tie 1400 into a self-feeding channel of the housing bracket 800 that guides the zip tie from a first side to an opposite side even when the housing bracket is flush-mounted to a surface, the self-feeding channel comprising a left side zip tie channel 824A and a right side zip tie channel 824B and a bottom zip tie channel 830 formed axially on a bottom surface 832 of the housing bracket (see FIGS. 8B, 8D, 14F). This improves blind routing and reduces installation effort.

The method for securing a plug to an electronic device may further comprise that the left side zip tie channel 824A and the right side zip tie channel 824B each include a bend 836A, 836B at a junction with a bracket base 832 configured to deflect a zip tie 1400 into and out of the bottom zip tie channel 830 during routing (see FIG. 8D). This reduces threading effort and misrouting in tight spaces.

Aligning a longitudinal guide ridge 864 of a tongue 860 on the housing bracket 800 with front and rear guiding notches 1276, 1278 of a retainer bottom groove 1272 to constrain insertion of the plug retainer 1200 along a defined axis may be performed (see FIGS. 8E, 12C). This improves insertion accuracy and repeatability.

Selecting one of a plurality of discrete insertion positions of the plug retainer 1200 relative to the housing bracket 800 by incremental advancement defined by the engagement mechanism to accommodate a depth of the plug overmold 1120 may be performed (see FIGS. 12D-12E, 14E). This ensures precise axial fit across different plugs and batches.

Selecting one of a plurality of zip tie apertures 1250 on the plug retainer 1200 based on a measured or observed overmold depth, wherein a small-depth aperture is used when the retainer is closest to a front surface of the device 700, a medium-depth aperture is used when the retainer is at an intermediate position, and a large-depth aperture is used when the retainer is farthest from the front surface, may be performed (see FIG. 12A). This maintains consistent tie geometry and load path across plug variants.

After the plug retainer 1200 is engaged with the housing bracket 800, a bottom surface 704 of the device housing 701 bearing against an upper surface of a lower wall 1260 of the plug retainer may apply a force that maintains positional lock during vibration may be performed (see FIG. 14E). This sustains preload to resist loosening.

Inserting the electronic device 700 into the housing bracket 800 may include elastically deflecting at least one bracket side wall 820A, 820B outwardly during insertion and allowing the side wall to return inwardly so that bracket snaps 823A, 823B, 827A, 827B seat into device side grooves 730A, 730B, 734A, 734B (see FIGS. 8A-8B, 9A-9B). This enables quick, reliable, tool-less seating of the electronic device.

The method for securing a plug to an electronic device may further comprise enclosing the zip tie 1400 within left and right side zip tie channels 824A, 824B of the housing bracket 800 to laterally confine the zip tie and resist displacement under vibration (see FIG. 14F). This prevents tie chafing and migration, extending service life.

Passing the overmold 1120 through the front wall aperture 1240 in the first orientation by aligning a largest cross-sectional dimension of the overmold with a width of the aperture, and rotating approximately 90 degrees to align the largest cross-sectional dimension with a height of the aperture to prevent withdrawal, may be performed (see FIGS. 12A, 14A-14B). This securely captures standard overmolds without custom features.

The method for securing a plug to an electronic device may further comprise, prior to tightening the zip tie 1400, adjusting the position of the housing bracket 800 on a mounting surface by sliding fasteners within elongated mounting slots 810A-810C of a planar base 801 of the housing bracket, and then fixing the final position using at least one fixed fastener hole 812 (see FIGS. 8A-8D). This improves installation accuracy and long-term stability.

The method for securing a plug to an electronic device may further comprise installing a transverse zip tie 1050 around a plug and through a transverse path defined by zip tie notches 720A-720D on the device housing 701 to secure a plug with an overmold recess 1025 to a receptacle 770 of the device 700, independently of the plug retainer 1200 (see FIGS. 7A, 10A-10C). This provides legacy compatibility and dual-retention capability where required.

Sliding the plug retainer 1200 into the bracket groove 853 may comprise manually gripping external ribs 1225 on a front wall 1220 of the retainer and finger recesses 1235A, 1235B on opposing sides of the retainer to facilitate insertion may be performed (see FIGS. 12A-12B, 13A-13B). This enhances ergonomics and reduces installer effort and slippage.

The method for securing a plug to an electronic device may further comprise removing the zip tie 1400 (if present), removing the electronic device 700 from the housing bracket 800 to relieve force on the retainer 1200, disengaging the engagement mechanism to free the retainer, sliding the retainer out of the bracket groove 853, unplugging the plug 1100 from the receptacle 770, rotating the plug approximately 90 degrees back to the first orientation, and withdrawing the overmold 1120 through the front wall aperture 1240 (see FIGS. 8C, 13B, 14A-14B). This defines a safe, repeatable removal procedure for serviceability.

The method for securing a plug to an electronic device may further comprise that a right zip tie channel 824B and a left zip tie channel 824A each include a bend 836A, 836B where the respective channel meets a bracket base 832, the bend being configured to deflect a zip tie 1400 into and out of a bottom zip tie channel 830 (see FIG. 8D). This streamlines tie routing during installation and maintenance.

The method for securing a plug to an electronic device may further comprise accessing a service window or access feature of the housing bracket 800 to elastically deflect a pawl 862 or disengage the engagement mechanism and remove the plug retainer 1200 without removing the electronic device 700 from the housing bracket 800 (see FIGS. 8C, 13B). This reduces service time and avoids disturbing the main mounting.

The method for securing a plug to an electronic device may further comprise routing the zip tie 1400 through the housing bracket 800 by inserting the zip tie into the left side zip tie channel 824A and the right side zip tie channel 824B at bends 836A, 836B configured to deflect the zip tie into and out of the bottom zip tie channel 830 during routing (see FIGS. 8B, 8D). This supports blind, efficient tie threading in constrained spaces.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

The invention claimed is:

1. A universal plug retention mechanism comprising:
a housing bracket configured to attach to an electronic device having a device housing and provide a plug retainer support interface;
a plug retainer configured to secure a plug to the electronic device and to accommodate plugs with varying overmold sizes; and
an engagement mechanism between the housing bracket and the plug retainer configured to permit advancement of the plug retainer toward the electronic device while resisting withdrawal, thereby providing discrete, adjustable positioning of the plug retainer relative to the housing bracket and securing the plug retainer against movement relative to the housing bracket during vibration or pulling forces to maintain the plug engaged with the device;
wherein the engagement mechanism comprises a ratchet rack including a plurality of parallel ratchet ribs each having a sloped leading surface and an upright trailing surface to allow insertion adjustment of the plug retainer toward the electronic device while resisting withdrawal; and
wherein the plug retainer support interface includes a tongue projecting into a bracket groove, and a ratchet pawl is formed at a distal end of the tongue.

2. The universal plug retention mechanism of claim 1, wherein the tongue further comprises a longitudinal guide ridge and the plug retainer comprises a retainer bottom groove with front and rear guiding notches sized to slidingly receive the guide ridge.

3. The universal plug retention mechanism of claim 2, wherein the retainer bottom groove is comprised of a plurality of notches formed on a top wall of a plurality of ratchet ribs.

4. The universal plug retention mechanism of claim 1, wherein the plug retainer includes a front wall aperture dimensioned to admit a plug overmold in a first orientation and to retain the plug overmold after rotation to a second orientation approximately 90 degrees from the first orientation.

5. The universal plug retention mechanism of claim 1, wherein the bracket groove receiving the plug retainer is formed in an extended portion of the housing bracket and has a rectangular cross-section with opposed sidewalls guiding insertion of the plug retainer.

6. The universal plug retention mechanism of claim 1, wherein the ratchet pawl is integrally molded with the housing bracket and includes a resilient hinge region enabling elastic deflection during advancement of the plug retainer.

7. A universal plug retention mechanism comprising:
a housing bracket configured to attach to an electronic device having a device housing and provide a plug retainer support interface;
a plug retainer configured to secure a plug to the electronic device and to accommodate plugs with varying overmold sizes; and
an engagement mechanism between the housing bracket and the plug retainer configured to permit advancement of the plug retainer toward the electronic device while resisting withdrawal, thereby providing discrete, adjustable positioning of the plug retainer relative to the housing bracket and securing the plug retainer against movement relative to the housing bracket during vibration or pulling forces to maintain the plug engaged with the device;
wherein, when the electronic device is installed in the housing bracket, a bottom surface of the device housing bears against an upper surface of a lower wall of the plug retainer to apply a force that maintains engagement between the housing bracket and the plug retainer during vibration or pulling forces, thereby securing the plug retainer against movement relative to the housing bracket and maintaining the plug engaged with the device.

8. The universal plug retention mechanism of claim 7, wherein the bracket groove includes a plurality of bracket groove sidewall teeth on opposed bracket groove sidewalls, and a plug retainer lower wall comprises left and right resilient fingers separated by a longitudinal slot, each finger having outwardly facing finger teeth that are engageable with the bracket groove sidewall teeth to provide discrete, adjustable positioning of the plug retainer relative to the housing bracket by side-to-side tooth engagement.

9. The universal plug retention mechanism of claim 7, wherein a bottom of the bracket groove includes a plurality of angled teeth and a plug retainer lower wall includes complementary angled teeth, the angled teeth being configured to permit insertion advancement by ramp sliding toward the electronic device while resisting withdrawal by a backstop angle.

10. The universal plug retention mechanism of claim 7, wherein an interference fit between the bottom surface of the device housing and the upper surface of the plug retainer lower wall is configured to maintain engagement between the housing bracket and the plug retainer.

11. A universal plug retention mechanism comprising:
a housing bracket configured to attach to an electronic device having a device housing and provide a plug retainer support interface;
a plug retainer configured to secure a plug to the electronic device and to accommodate plugs with varying overmold sizes; and
an engagement mechanism between the housing bracket and the plug retainer configured to permit advancement of the plug retainer toward the electronic device while resisting withdrawal, thereby providing discrete, adjustable positioning of the plug retainer relative to the housing bracket and securing the plug retainer against movement relative to the housing bracket during vibration or pulling forces to maintain the plug engaged with the device;
wherein the plug retainer includes a front wall aperture dimensioned to admit a plug overmold in a first orientation and to retain the plug overmold after rotation to a second orientation approximately 90 degrees from the first orientation; and
wherein the plug retainer includes a plurality of zip tie apertures positioned at different distances from the front wall aperture to accommodate different overmold depths.

12. The universal plug retention mechanism of claim 11, further comprising a zip tie routed through zip tie channels of the housing bracket and through a selected one of the zip tie apertures of the plug retainer, the zip tie preventing front-to-back translation of the retainer relative to the housing bracket.

13. The universal plug retention mechanism of claim 12, wherein the housing bracket includes a left side zip tie channel and a right side zip tie channel each configured to laterally confine the zip tie and resist displacement under vibration.

14. The universal plug retention mechanism of claim 13, wherein the housing bracket includes a self-feeding zip tie channel arranged to guide a zip tie from a first side of the bracket to an opposite side even when the bracket is flush-mounted to a surface, the self-feeding zip tie channel being comprised of the left side zip tie channel and the right side zip tie channel and a bottom zip tie channel formed axially on a bottom surface of the housing bracket.

15. The universal plug retention mechanism of claim 11, wherein the bracket groove includes a plurality of bracket groove sidewall teeth on opposed bracket groove sidewalls, and a plug retainer lower wall comprises left and right resilient fingers separated by a longitudinal slot, each finger having outwardly facing finger teeth that are engageable with the bracket groove sidewall teeth to provide discrete, adjustable positioning of the plug retainer relative to the housing bracket by side-to-side tooth engagement.

16. The universal plug retention mechanism of claim 11, wherein a bottom of the bracket groove includes a plurality of angled teeth and a plug retainer lower wall includes complementary angled teeth, the angled teeth being configured to permit insertion advancement by ramp sliding toward the electronic device while resisting withdrawal by a backstop angle.

17. A universal plug retention mechanism comprising:
a housing bracket configured to attach to an electronic device having a device housing and provide a plug retainer support interface;

a plug retainer configured to secure a plug to the electronic device and to accommodate plugs with varying overmold sizes; and an engagement mechanism between the housing bracket and the plug retainer configured to permit advancement of the plug retainer toward the electronic device while resisting withdrawal, thereby providing discrete, adjustable positioning of the plug retainer relative to the housing bracket and securing the plug retainer against movement relative to the housing bracket during vibration or pulling forces to maintain the plug engaged with the device;

wherein the housing bracket further includes snap members on opposite side walls configured to engage complementary side grooves on the electronic device to retain the bracket to the device by a snap fit.

18. The universal plug retention mechanism of claim 17, wherein at least one of the bracket side walls is resiliently deflectable outward during insertion of the electronic device and returns inward to engage the side grooves after insertion.

19. The universal plug retention mechanism of claim 17, wherein the bracket groove includes a plurality of bracket groove sidewall teeth on opposed bracket groove sidewalls, and a plug retainer lower wall comprises left and right resilient fingers separated by a longitudinal slot, each finger having outwardly facing finger teeth that are engageable with the bracket groove sidewall teeth to provide discrete, adjustable positioning of the plug retainer relative to the housing bracket by side-to-side tooth engagement.

20. The universal plug retention mechanism of claim 17, wherein a bottom of the bracket groove includes a plurality of angled teeth and a plug retainer lower wall includes complementary angled teeth, the angled teeth being configured to permit insertion advancement by ramp sliding toward the electronic device while resisting withdrawal by a backstop angle.

21. A universal plug retention mechanism comprising:

a housing bracket configured to attach to an electronic device having a device housing and provide a plug retainer support interface;

a plug retainer configured to secure a plug to the electronic device and to accommodate plugs with varying overmold sizes; and an engagement mechanism between the housing bracket and the plug retainer configured to permit advancement of the plug retainer toward the electronic device while resisting withdrawal, thereby providing discrete, adjustable positioning of the plug retainer relative to the housing bracket and securing the plug retainer against movement relative to the housing bracket during vibration or pulling forces to maintain the plug engaged with the device;

wherein the housing bracket has a right zip tie channel and a left zip tie channel each including a bend where the respective channel meets a bracket base, the bend being configured to deflect a zip tie into and out of a bottom zip tie channel.

22. The universal plug retention mechanism of claim 21, wherein the bracket groove includes a plurality of bracket groove sidewall teeth on opposed bracket groove sidewalls, and a plug retainer lower wall comprises left and right resilient fingers separated by a longitudinal slot, each finger having outwardly facing finger teeth that are engageable with the bracket groove sidewall teeth to provide discrete, adjustable positioning of the plug retainer relative to the housing bracket by side-to-side tooth engagement.

23. The universal plug retention mechanism of claim 21, wherein a bottom of the bracket groove includes a plurality of angled teeth and a plug retainer lower wall includes complementary angled teeth, the angled teeth being configured to permit insertion advancement by ramp sliding toward the electronic device while resisting withdrawal by a backstop angle.

* * * * *